US008761697B2

(12) United States Patent
Gossmann

(10) Patent No.: US 8,761,697 B2
(45) Date of Patent: Jun. 24, 2014

(54) SIGNAL PROCESSING DEVICE AND METHOD FOR PROVIDING A FIRST ANALOG SIGNAL AND A SECOND ANALOG SIGNAL

(75) Inventor: Timo Gossmann, Neubiberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/589,486

(22) Filed: Aug. 20, 2012

(65) Prior Publication Data

US 2013/0052972 A1 Feb. 28, 2013

(30) Foreign Application Priority Data

Aug. 26, 2011 (DE) .......................... 10 2011 081 689

(51) Int. Cl.
*H04B 1/04* (2006.01)
*H03C 1/62* (2006.01)
*H04L 7/00* (2006.01)
*H04L 27/36* (2006.01)

(52) U.S. Cl.
CPC ............. *H01L 27/361* (2013.01); *H04L 7/0016* (2013.01); *H04L 7/0037* (2013.01); *H04L 7/0054* (2013.01); *H04L 27/36* (2013.01)
USPC ...................... 455/114.3; 455/115.1; 455/120

(58) Field of Classification Search
CPC ... H04L 7/0008; H04L 7/0016; H04L 7/0033; H04L 7/0037; H04L 7/0054; H04L 7/033; H04L 27/36; H04L 27/361
USPC ........ 455/102, 108, 110, 114.1, 114.3, 115.1, 455/120, 124, 125
See application file for complete search history.

(56) References Cited

U.S. PATENT DOCUMENTS

| 7,359,680 | B2* | 4/2008 | Klemmer ....................... 455/102 |
| 7,715,808 | B2* | 5/2010 | Shimizu et al. ............... 455/108 |
| 7,817,747 | B2* | 10/2010 | Waheed et al. ............... 375/298 |
| 7,995,697 | B2 | 8/2011 | Lewis et al. |
| 8,498,589 | B2* | 7/2013 | Husted et al. ................. 455/102 |
| 8,514,972 | B2* | 8/2013 | Kang et al. .................... 375/296 |
| 8,520,767 | B2* | 8/2013 | Omoto et al. ................. 375/295 |
| 2005/0025252 | A1* | 2/2005 | Tate et al. ...................... 375/257 |
| 2005/0047532 | A1 | 3/2005 | Servilio et al. |
| 2006/0246856 | A1* | 11/2006 | Udagawa et al. ............. 455/108 |
| 2007/0189417 | A1* | 8/2007 | Waheed et al. ............... 375/300 |
| 2007/0189431 | A1* | 8/2007 | Waheed et al. ............... 375/376 |

(Continued)

FOREIGN PATENT DOCUMENTS

WO 2008106415 A1 9/2008

*Primary Examiner* — Duc M Nguyen
(74) *Attorney, Agent, or Firm* — Eschweiler & Associates, LLC

(57) ABSTRACT

A signal processing device for providing first and second analog signals includes first and second clocked digital signal path circuits and a transit time difference measuring device. The first clocked digital signal path circuit is configured to yield first digital data for providing a first analog signal. The second clocked digital signal path circuit is configured to yield second digital data for providing the second analog signal. The transit time difference measuring device is configured to yield a transit time difference measuring signal describing a difference between a signal transit time along a first measuring path and a signal transit time along a second measuring path, with the first measuring path including a first clock supply allocated to the first clocked digital signal path circuit, and with the second measuring path including a second clock supply allocated to the second clocked digital signal path circuit.

15 Claims, 11 Drawing Sheets

(56) References Cited

U.S. PATENT DOCUMENTS

| | | |
|---|---|---|
| 2008/0205571 A1* | 8/2008 | Muhammad et al. ......... 375/376 |
| 2008/0242246 A1* | 10/2008 | Minnis et al. .............. 455/127.1 |
| 2008/0310573 A1 | 12/2008 | Lewis et al. |
| 2010/0124889 A1* | 5/2010 | Osman et al. ................. 455/108 |
| 2010/0291885 A1* | 11/2010 | Shimizu et al. ............... 455/102 |
| 2011/0156832 A1 | 6/2011 | Menkhoff |
| 2012/0319749 A1* | 12/2012 | Thaller et al. ................. 327/158 |

\* cited by examiner

SIGNAL PROCESSING DEVICE AND METHOD FOR PROVIDING A FIRST ANALOG SIGNAL AND A SECOND ANALOG SIGNAL

REFERENCE TO RELATED APPLICATION

This application claims priority to German Patent Application No. 102011081689.5, filed on Aug. 26, 2011, and is incorporated herein in its entirety by reference.

FIELD

The disclosure relates to a signal processing device and a method for providing a first analog signal and a second analog signal. Additional examples of the disclosure relate to an AM/PM bias in a digital-polar transmitter architecture.

BACKGROUND

The so-called polar modulation represents a method for generating a phase- and amplitude-modulated carrier signal. Here, the phase and/or the frequency of a high-frequency carrier is typically modulated via a respectively addressed PLL (phase-locked loop) and then additionally an amplitude modulation is imposed on the phase-modulated carrier by way of multiplication with a respective signal, as, for example, according to the following equation.

$$RF(t) = A(t) \cdot \cos(2\pi f(t) + \phi_0) \quad (1)$$

In a polar modulator the input-side modulation information is separated into phase and amplitude information and processed separately. Polar modulators can be used in mobile radio devices, which are based on special modulation methods, for example, according to the mobile radio standard GSM-EDGE (Global System for Mobile Communication-Enhanced Data Rate for GSM Evolution) or UMTS.

In the past, in systems of conventional technology for polar modulators the clocks for the digital signal processing for the DAC in the amplitude path (Digital Analog Converter), the DCO, as well as the LO (local oscillator) channel frequency was generated from the VCO/DCO (Voltage/Digitally Controlled Oscillator) output frequency via separate particular divider circuits.

SUMMARY

According to one example, a signal processing device for providing a first analog signal and a second analog signal may have a first clocked digital signal path circuit, configured to yield first digital data for providing the first analog signal, a second clocked digital signal path circuit, configured to yield second digital data for providing the second analog signal. The signal processing device further includes a transit time difference measuring device configured to yield a transit time difference measuring signal describing a difference between a signal transit time along a first measuring path and a signal transit time along a second measuring path, with the first measuring path comprising a first clock supply allocated to the first clocked digital signal path circuit, and with the second measuring path comprising a second clock supply allocated to the second clocked digital signal path circuit.

According to another example, a signal processing device for providing a first analog signal and a second analog signal may have a first clocked digital signal path circuit configured to yield first digital data for providing the first analog signal, and a second clocked digital signal path circuit configured to yield second digital data for providing the second analog signal. The signal processing device further includes a transit time difference measuring device configured to yield a transit time difference measuring signal describing a difference between a signal transit time along a first measuring path and a signal transit time along a second measuring path, with the first measuring path comprising a first clock supply allocated to a last synchronous stage of the first clocked digital signal path circuit, and with the second measuring path comprising a second clock supply allocated to a last synchronous stage of the second clocked digital signal path circuit.

According to another example, a signal processing device for providing a first analog signal and a second analog signal may have a first clocked digital signal path circuit configured to yield first digital data for providing the first analog signal, and a second clocked digital signal path circuit configured to yield second digital data for providing the second analog signal. The signal processing device further includes a clock generator configured to provide a first clock signal to clock a last synchronous stage of the first clocked digital signal path circuit and a second clock signal to clock a last synchronous stage of the second clocked digital signal path circuit, with the clock generator being configured to adjust a relative temporal position of clock edges of the first clock signal and clock edges of the second clock signal in reference to each other in order to achieve a temporal synchronization of the first analog signal and the second analog signal.

According to another example, a method for providing a first analog signal and a second analog signal may comprise clocked switching of a first clocked digital signal path circuit to yield first digital data for providing the first analog signal, and clocked switching of a second clocked digital signal path circuit to yield second digital data for providing the second analog signal. The method further comprises measuring a difference between a signal transit time along a first measuring path and a signal transit time along a second measuring path in order to yield a transit time difference measuring signal, wherein the first measuring path comprises a first clock supply allocated to the first clocked digital signal path circuit, and wherein the second measuring path comprises a second clock supply allocated to the second clocked digital signal path circuit.

BRIEF DESCRIPTION OF THE DRAWINGS

Embodiments of the present invention will be detailed subsequently referring to the appended drawings, in which.

DETAILED DESCRIPTION

Figure 1:
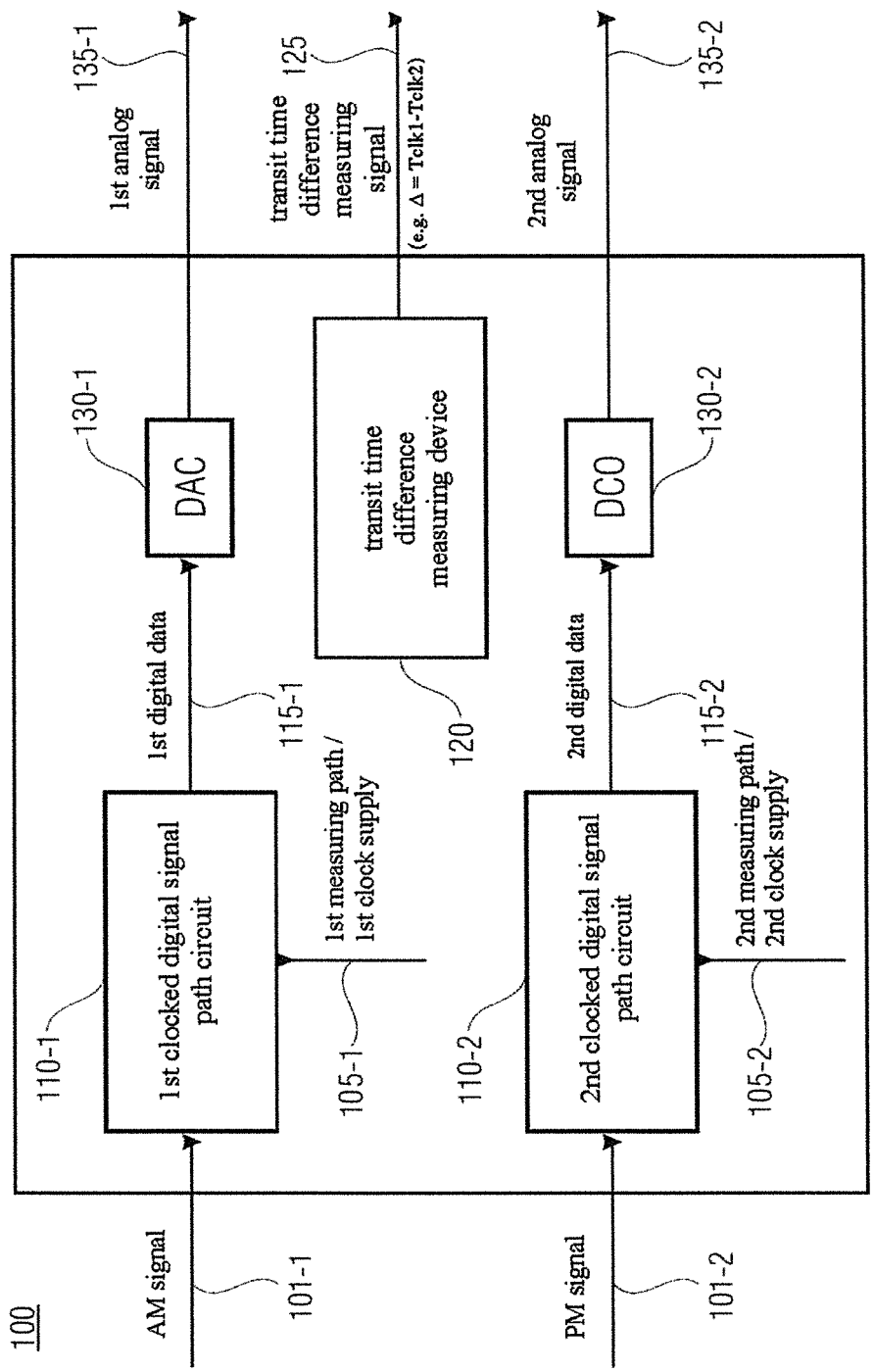
FIG. 1 is a block diagram of a signal processing device for providing a first analog signal and a second analog signal with a delay time measuring device according to one example of the disclosure.

Before in the following the present invention is explained in detail based on the figures it shall be pointed out that in the exemplary embodiments shown in the following, identical elements or elements with the same function are provided with the same reference characters in the figures. A description of elements with the same reference characters can therefore be mutually exchanged and/or applied to each other in the various exemplary embodiments.

In a polar modulator, during the separate processing of the phase and amplitude information, and due to digital and/or analog latencies in the various circuit blocks, a difference may result between the signal transit time of the AM and PM signals. Accordingly, the polar modulator no longer operates with sufficient precision so that the performance of the polar modulator can significantly worsen.

Therefore it is desired to allow measuring the delay time and, perhaps based on the knowledge of the measured delay time, perform an adjustment of the temporal synchronization of the AM and PM signals.

FIG. 1 shows a block diagram of a signal processing device 100 for providing a first analog signal 135-1 and a second analog signal 135-2 with a delay time measuring device 120 according to one example of the disclosure. As shown in FIG. 1, the signal processing device 100 comprises a first clocked digital signal path circuit 110-1, a second clocked digital signal path circuit 110-2, and the delay time measuring device 120. Here, the first clocked digital signal path circuit 110-1 is configured to yield first digital data 115-1 for providing the first analog signal 135-1. Further, the second clocked digital signal path circuit 110-2 is configured to yield second digital data 115-2 for providing the second analog signal 135-2. The delay time measuring device 120 of the signal processing device 100 shown in FIG. 1 is configured to yield a transit time difference measuring signal 125, which describes a difference between a signal transit time along a first measuring path 105-1 and a signal transit time along a second measuring path 105-2. In the example according to FIG. 1 the first measuring path 105-1 comprises a first clock supply allocated to the first clocked digital signal path circuit 110-1. Further the second measuring path 105-2 comprises a second clock supply allocated to the second clocked digital signal path circuit 110-2.

The first clocked digital signal path circuit 110-1 of the signal processing device 100 may be configured to yield the first digital data 115-1 depending on an AM input signal 101-1. Further the second clocked signal path circuit 110-2 of the signal processing device 100 may be configured to yield the second digital data 115-2 depending on a PM input signal 101-2. As discernible in FIG. 1, the signal processing device 100 may comprise a digital to analog converter (DAC) 130-1 and a digitally controlled oscillator (DCO) 130-2. Here, the DAC 130-1 may be configured to provide the first analog signal 135-1 depending on the first digital data 115-1. Further the DOC 130-2 may be configured to provide the second analog signal 135-2 depending on the second digital data 115-2.

In the example shown in FIG. 1 the transit time difference measurement signal 125 yielded by the transit time difference measuring device 120 may, for example, describe a difference $\Delta$ between a signal transit time Tclk1 along the first clock supply and a signal transit time Tclk2 along the second clock supply (e.g., $\Delta$=Tclk1−Tclk2).

Figure 2:
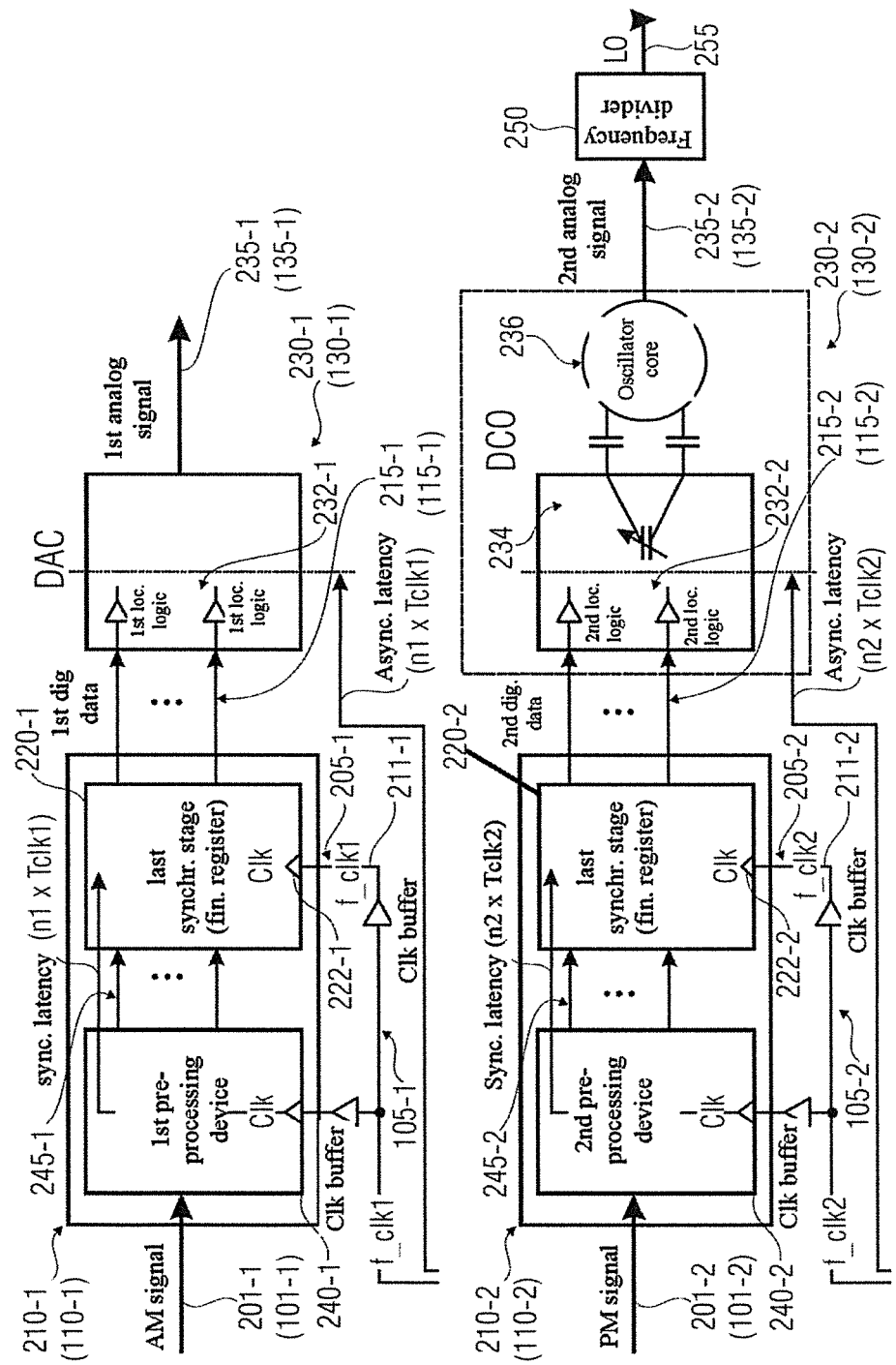
FIG. 2 is a block diagram of a first and a second clocked digital signal path circuit with allocated last synchronous stages and a DAC and a DCO of the signal processing device according to FIG. 1.

FIG. 2 shows a block diagram of examples of a first and a second clocked digital signal path circuit 210-1, 210-2 with allocated last synchronous stages 220-1, 220-2 and exemplary embodiments of a DAC 230-1 and a DCO 230-2 of the signal processing device 100 according to FIG. 1. The first clocked digital signal path circuit 210-1, the DAC 230-1, the second clocked digital signal path circuit 210-2, and the DCO 230-2 in FIG. 2 are essentially equivalent to the first clocked digital signal path circuit 110-1, the DAC 130-1, the second clocked digital signal path circuit 110-2, and the DCO 130-2 in FIG. 1. The first clocked digital signal path circuit 210-1 shown in FIG. 2 is configured to yield first digital data 215-1 depending on an AM input signal 201-1. Further, the second clocked digital signal path circuit 210-2 shown in FIG. 2 is configured to yield second digital data 215-2 depending on a PM input signal 201-2. Here, the AM input signal 201-1, the first digital data 215-1, the PM input signal 201-2, and the second digital data 215-2 in FIG. 2 are essentially equivalent to the AM input signal 101-1, the first digital data 115-1, the PM input signal 101-2, and the second digital data 115-2 in FIG. 1.

With reference to FIG. 2, the first clocked digital signal path circuit 210-1 comprises an allocated last synchronous stage 220-1 with a first clock input 222-1 for a first clock signal (clk1). Further, the second clocked digital signal path circuit 210-2 comprises an allocated last synchronous stage 220-2 with a second clock input 222-2 for a second clock signal (clk2).

It is discernible in FIG. 2 that the first clock supply 205-1 of the first measuring path 105-1 may be connected to the first clock input 222-1 of the last synchronous stage 220-1 of the first clocked digital signal path circuit 210-1. Further, the second clock supply 205-2 of the second measuring path 105-2 may be connected to the second clock input 222-2 of the last synchronous stage 220-2 of the second clocked digital signal path circuit 210-2.

With reference to FIGS. 1 and 2, in the examples using a transit time difference measuring device, a transit time difference measuring signal can be provided which describes a difference between the signal transit time along the first clock supply 205-1 and a signal transit time along the second clock supply 205-2.

In one example the last synchronous stage 220-1 of the first clocked digital signal path circuit 210-1 and the last synchronous stage 220-2 of the second clocked digital signal path circuit 210-2 may each be embodied as a final register and/or a final control signal register. Further, in one example the data signals inside the first and the second clocked digital signal path circuit 210-1, 210-2 and the first and second digital data 215-1, 215-2 provided by the first and second clocked digital signal path circuit 210-1, 210-2 may be transmitted along several digital-control lines.

According to FIG. 2 the first clock supply 205-1 may be configured to provide the first clock signal with a first clock frequency 211-1, fclk1, in order to clock the last synchronous stage 220-1 of the first clocked digital signal path circuit 210-1. Further, according to FIG. 2, the second clock supply 205-2 may be configured to provide the second clock signal with a second clock frequency 211-2, fclk2, to clock the last synchronous stage 220-2 of the second clocked digital signal path circuit 210-2.

In examples according to FIG. 2 the digital-to-analog converter 230-1 (DAC) may comprise a first local logical element 232-1. The DAC 230-1 shown in FIG. 2 is configured to convert the first digital data 215-1 supplied by the first clocked digital signal path circuit 210-1 into the first analog signal 235-1. Further the digitally controlled oscillator 230-2 (DCO) may comprise a second local logical element 232-2. The DCO 230-2 shown in FIG. 2 is configured to convert the second digital data 215-2 supplied by the second clocked digital signal path circuit 210-2 into the second analog signal 235-2.

In the examples of FIGS. 1 and 2 the first measuring path 105-1 may comprise the first clock supply 205-1, while the second measuring path 105-2 may comprise the second clock supply 205-2.

In other examples of FIGS. 1 and 2 the first measuring path 105-1 may comprise a first signal path from an output of the last synchronous stage 220-1 of the first clocked digital signal path circuit 210-1 to an output of the first local logical element 232-1 of the DAC 230-1. Further the second measuring path 105-2 may comprise a second signal path from an outlet of the last synchronous stage 220-2 of the second clocked digital signal path circuit 210-2 to an outlet of the second local logical element 232-2 of the DCO 230-2.

In other examples the transit time difference measuring device may be configured to yield a transit time difference measuring signal, which describes a difference between a signal transit time along the first clock supply 205-1 and along the first signal path from the outlet of the last synchronous stage 220-1 of the first clocked digital signal path circuit 210-1 to the outlet of the first local logical element 232-1 of the DAC 230-1 and a signal transit time along the second clock supply 205-2 and along the second signal path from the outlet of the last synchronous stage 220-2 of the second clocked digital signal path circuit 210-2 to the output of the second local logical element 232-2 of the DCO 230-2.

With reference to FIG. 2 it shall be pointed out that the AM input signal 201-1 and the PM input signal 201-2 may represent data from a primary digital signal processing part and/or block. Further, the first analog signal 235-1 provided by the DAC 230-1 may represent an AM output signal, which carries the information of the amplitude modulation (AM), while the second analog signal 235-2 provided by the DCO 230-2 may represent a PM output signal carrying the information of the phase modulation (PM).

In one example the DAC 230-1 may comprise an arrangement of switchable analog power or voltage sources. Further, the DCO 230-2 may comprise an arrangement 234 of switchable capacities and an oscillator core 236.

In another example the first clocked digital signal path circuit 210-1 may comprise a first pre-processing device 240-1, while the second clocked digital signal path circuit 210-2 may comprise a second pre-processing device 240-2. Here, the first pre-processing device 240-1 may be configured to provide a first pre-processed data signal 245-1 depending on the AM input signal 201-1. Further the second pre-processing device 240-2 may be configured to provide a second pre-processed data signal 245-2 depending on the PM input signal 201-2.

Further, FIG. 2 shows a frequency divider 250 switched downstream in reference to the DCO 230-2. The frequency divider 250 shown in FIG. 2 may be configured to provide a local oscillator (LO) signal 255 based on the second analog signal 235-2 supplied by the DCO 230-2.

In the examples the blocks 240-1 and 220-1 shown in FIG. 2 of the first clocked digital signal path circuit 210-1 and/or the blocks 240-2 and 220-2 shown in FIG. 2 of the second clocked digital signal path circuit 210-2 may represent synchronous clocked digital circuits.

With reference to FIG. 2, the DAC may be considered a switched power or voltage source, which calculates respective analog output parameters based on a perhaps pre-processed digital input signal. The calculation occurs in a digital circuit clocked with fclk1, comprising a certain synchronous and asynchronous latency, i.e., the signal parameter is available at the output only after a certain number of clocks, $n1 \cdot Tclk1$, plus a certain analog signal period, Tprop1, of the clock and the signal itself.

The DCO and/or oscillator also adjusts, perhaps after a digital pre-processing, a frequency in the oscillating circuit by switching on and off various frequency-determining elements (switched capacities) synchronized by a clock frequency fclk2.

As described above, a frequency divider may be arranged downstream in reference to the oscillator generating with a fixed divider rate a lower channel frequency (fLO), useful for the operation, from the oscillator frequency. The oscillator can to a certain extent be considered, together with the frequency divider, as a DAC, with its output parameter, however, being the frequency of the signal oscillation generated. Accordingly, this oscillator also comprises a synchronous, $n2 \cdot Tclk2$, and an asynchronous latency, Tprop2, of the output frequency in reference to the digital input signal.

With reference to FIGS. 1 and 2, in other examples the signal processing device 100 may comprise a first clocked digital signal path circuit 210-1, a second clocked digital signal path circuit 210-2, and a transit time difference measuring device 120 for providing the first analog signal 135-1 and the second analog signal 135-2. Here, the first clocked digital signal path circuit 210-1 may be configured to yield first digital data 215-1 to provide the first analog signal 235-1. Further, the second clocked digital signal path circuit 210-2 may be configured to yield second digital data 215-2 to provide the second analog signal 235-2.

In particular, here the transit time difference measuring device 120 may be configured to yield a transit time difference measuring signal 125 describing a difference between a signal transit time along a first measuring path 105-1 and a signal transit time along a second measuring path 105-2. The first measuring path 105-1 may here comprise a first clock supply 205-1 allocated to a last synchronous stage 220-1 of the first clocked digital signal path circuit 210-1 while the second measuring path 105-2 may comprise a second clock supply 205-2 allocated to a last synchronous stage 220-2 of the second clocked digital signal path circuit 210-2.

Figure 3A:
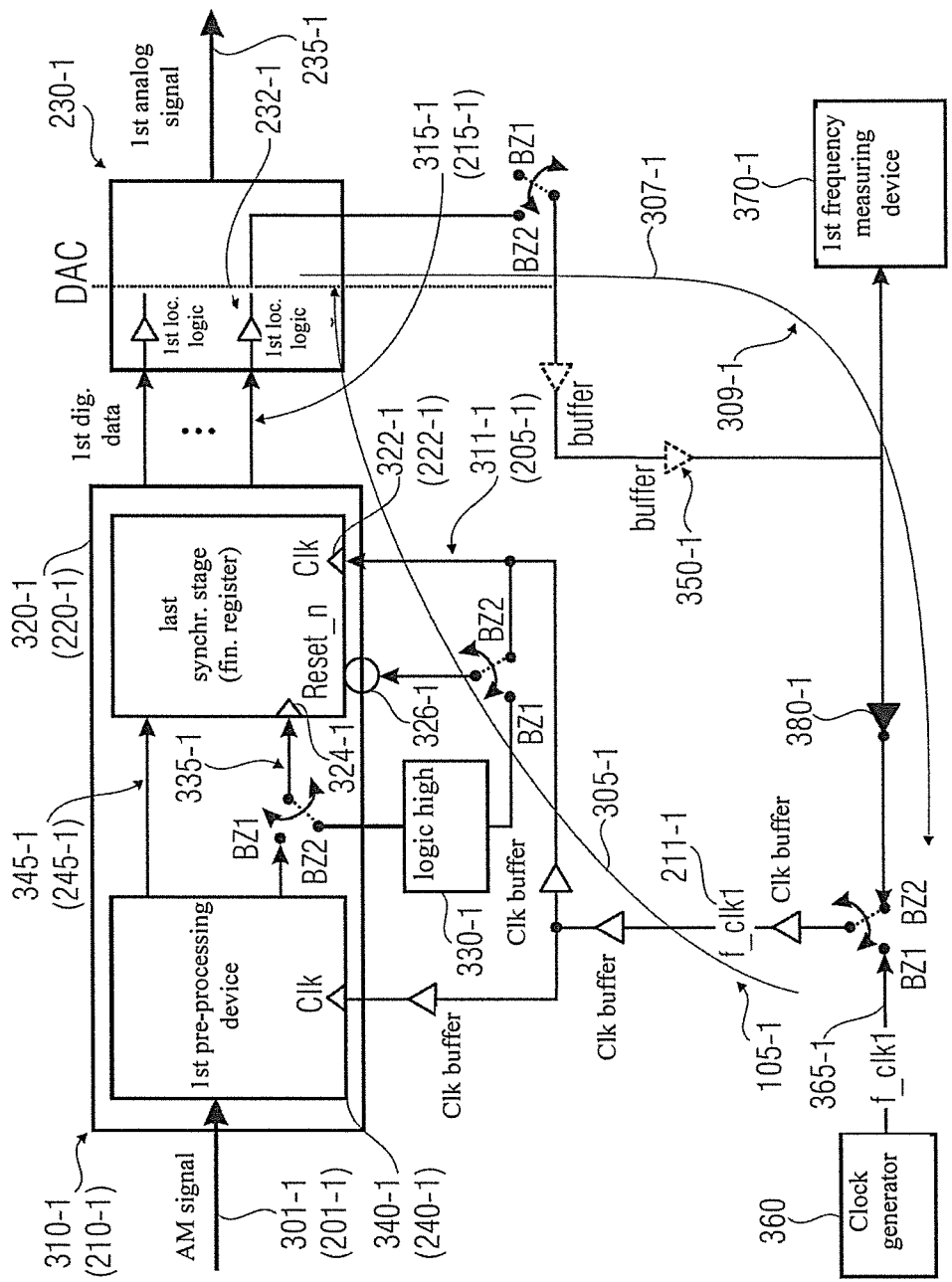
FIGS. 3a and 3b are block diagrams of a first and/or a second measuring path of the signal processing device according to FIG. 1 with one respective frequency measuring device to measure a frequency of an oscillation in a ring oscillator.
Figure 3B:
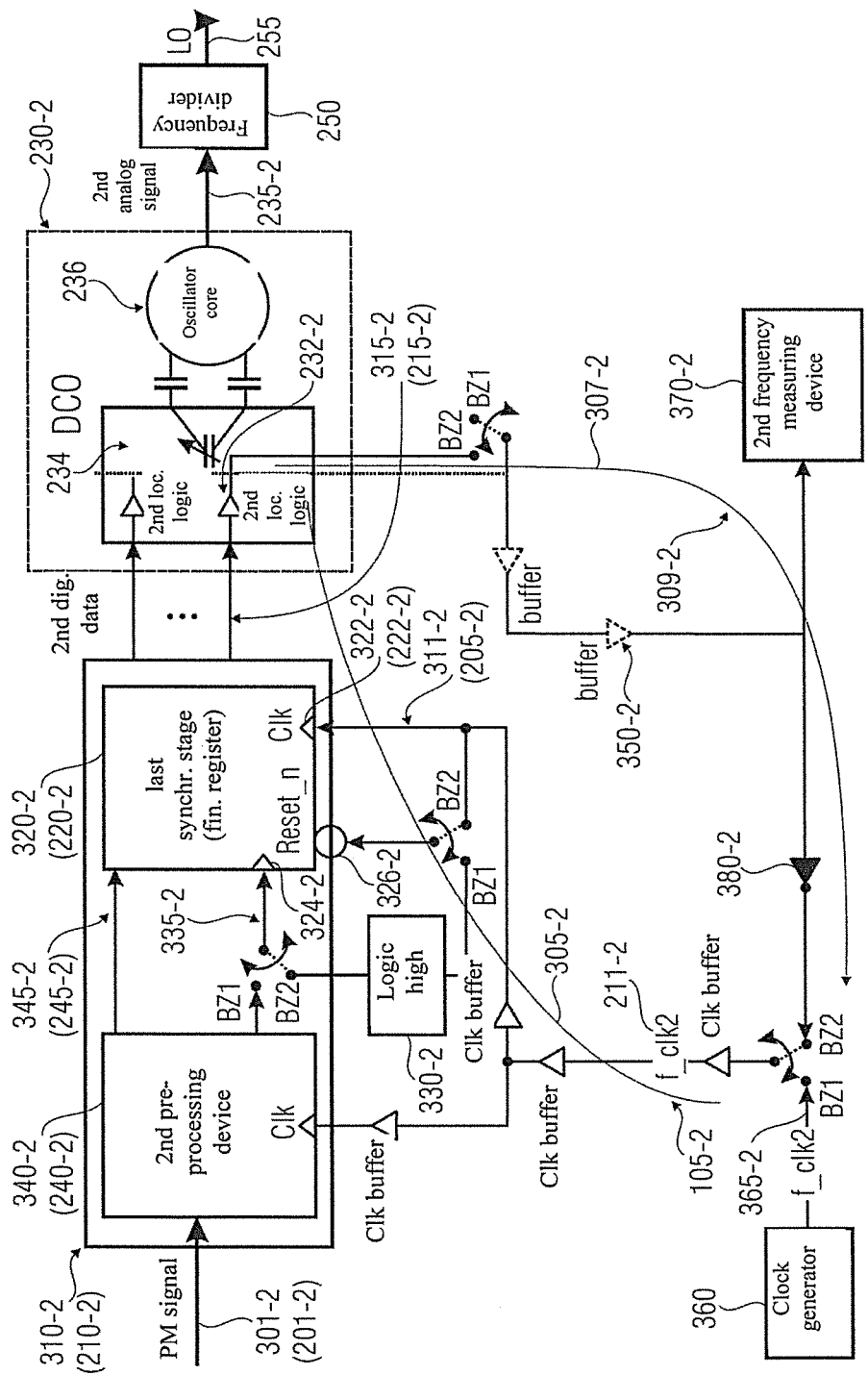

FIGS. 3a and 3b each show an example block diagram of a first and/or a second measuring path 105-1, 105-2 of the signal processing device 100 according to FIG. 1 with one frequency measuring device 370-1, 370-2 each to measure a frequency of an oscillation in a first ring oscillator and a frequency of an oscillation in a second ring oscillator. The blocks 310-1, 320-1, 340-1 and/or 310-2, 320-2, 340-2 shown in FIGS. 3a and 3b are essentially equivalent to the blocks 210-1, 220-1, 240-1 and/or 210-2, 220-2, 240-2 shown in FIG. 2. As shown in FIGS. 3a and 3b, the first measuring path 105-1 comprises a first forward path 305-1, wherein the first forward path 305-1 can be connected to a first reverse path 307-1 so that a first closed ring 309-1 is formed. Further, the second measuring path 105-2 comprises a second forward path 305-2, wherein the second forward path 305-2 can be connected to a second reverse path 307-2 so that a second closed ring 309-2 is formed. In particular, the first forward path 305-1 and the first reverse path 307-1 may be a part of a first ring oscillator, when the first ring 309-1 is closed. Further, the second forward path 305-2 and the second reverse path 307-2 may be a part of a second ring oscillator when the second ring 309-2 is closed.

In one example the transit time difference measuring device 120 shown in FIG. 1 may comprise a frequency measuring device configured to successively or simultaneously measure the frequency of an oscillation in the first ring oscillator and a frequency of an oscillation in the second ring oscillator. In particular, the transit time difference measuring device 120 may be configured to determine a difference between the signal transit time along the first forward path 305-1 and a signal transit time along the second forward path 305-2 based on the first measured frequency and the second measured frequency.

In examples according to FIGS. 3a and 3b the frequency measuring device may comprise a first frequency measuring device 370-1 and a second frequency measuring device 370-2. As shown in FIGS. 3a and 3b, here the first frequency measuring device 370-1 can be connected to the first closed ring 309-1, while the second frequency measuring device 370-2 can be connected to the second closed ring 309-2.

In other examples the two devices 370-1 and 370-2 (frequency measuring devices in FIGS. 3a and 3b) may represent a device used commonly by both paths, which can be switched back and forth alternating between the paths. This way the measurement (frequency measurement) can be performed successively in both paths (for example alternating) using a joint measuring device.

In particular, in examples according to FIGS. 3a and 3b the first reverse path and the second reverse path may be embodied to obtain identical signal transit times along the first reverse path and along the second reverse path.

In other examples according to FIGS. 3a and 3b the first forward path 305-1 or the first reverse path 307-1 may comprise at least one inverter 380-1 (see FIG. 3a) so that the number of inverters in the first closed ring 309-1 is odd, while the second forward path 305-2 or the second reverse path 307-2 may comprise at least one inverter 380-2 (see FIG. 3b) so that the number of inverters in the second closed ring 309-2 is odd.

FIG. 3a shows a first clocked digital signal path circuit 310-1, which comprises a last synchronous stage 320-1 with a first clock input 322-1 for a first clock signal. Further, FIG. 3b shows a second clocked signal path circuit 310-2, which comprises a last synchronous stage 320-2 with a second clock input 322-2 for a second clock signal.

As shown in FIG. 3a, a first clock supply 311-1 of the first forward path 305-1 is connected to the first clock input 322-1 of the last synchronous stage 320-1 of the first clocked digital signal path circuit 310-1. As shown in FIG. 3b, a second clock supply 311-2 of the second forward path 305-2 is connected to the second clock input 322-2 of the last synchronous stage 320-2 of the second clocked digital signal path circuit 310-2.

In examples according to FIGS. 3a and 3b the signal processing device can further comprise a first data signal provider 330-1 (see FIG. 3a) and a second data signal provider 330-2 (see FIG. 3b). The first data signal provider 330-1 is configured to provide a first data signal 335-1, while the second data signal provider 330-2 is configured to provide a second data signal 335-2.

According to FIG. 3a, the first data signal provider 330-1 may be configured to provide in a useful data forwarding operating state the first data signal 335-1 depending on useful data describing the first analog signal 235-1, and in order to provide in a measuring operating state a predetermined logical value as a first data signal 335-1. Further, according to FIG. 3b the second data signal provider 330-2 may be configured to provide in a useful data forwarding operating state the second data signal 335-2 depending on useful data describing the second analog signal 235-2, and in order to provide in a measuring operating state a predetermined logical value as a second data signal 335-2.

In other examples useful data 345-1, describing the first analog signal 235-1, can be provided by a first pre-processing device 340-1 depending on an AM input signal 301-1. Further, useful data 345-2 describing the second analog signal 235-2 can be provided by a second pre-processing device 340-2 depending on a PM input signal 301-2.

In examples the predetermined logical value supplied by the first data signal provider 330-1 and/or the second data signal provider 330-2 may be given as a constant potential, such as in the form of a constant high-potential or a constant low-potential. Here, the constant potential and/or the predetermined logical value may represent, for example, a logical one, a logical zero, or a value therebetween. The examples are provided by the first and the second data signal provider 330-1, 330-2 as first and second data signals 335-1, 335-2, each, for example, as a logical one. Accordingly, the blocks 330-1, 330-2 shown in FIGS. 3a and 3b, are marked "logical high."

With reference to FIGS. 3a and 3b the last synchronous stage 320-1 of the first clocked digital signal path circuit 310-1 comprises a first data input 324-1, connected to the first data signal provider 330-1, and a first reset input 326-1 connected to the first clock supply 311-1 of the first forward path 305-1. Further, the last synchronous stage 320-2 of the second clocked digital signal path circuit 310-2 may comprise a second data input 324-2, connected to the second data signal provider 330-2, and a second reset input 326-2, which can be connected to the second clock supply 311-2 of the second forward path 305-2.

In examples the first and the second reset input 326-1, 326-2 may represent asynchronous reset inputs. In FIGS. 3a and 3b the first and the second reset input 326-1, 326-2 are marked "Reset_n."

In particular in examples according to FIGS. 3a and 3b the last synchronous stage 320-1 of the first clocked digital signal path circuit 310-1 is configured to trigger a relay of the logical value applied at the first data input 324-1 to the output of the last synchronous stage 320-1 of the first clocked digital signal path circuit 310-1 by a clock edge of a first clock signal, which occurs at the first clock input 322-1 of the last synchronous stage 320-1 of the first clocked digital signal path circuit 310-1. Further, the last synchronous stage 320-2 of the second clocked digital signal path circuit 310-2 is configured to trigger a relay of a logical value applied at the second data input 324-2 to the output of the last synchronous stage 320-2 of the second clocked digital signal path circuit 310-2 by a clock edge of a second clock signal, which occurs at the second clock input 322-2 of the last synchronous stage 320-2 of the second clocked digital signal path circuit 310-2.

Furthermore, in examples according to FIGS. 3a and 3b the last synchronous stage 320-1 of the first clocked digital signal path circuit 310-1 is configured to cause the last synchronous stage 320-1 of the first clocked digital signal path circuit 310-1 to be reset, triggered by a reset signal level of the first clock signal applied at the first clock supply 311-1. Further, the last synchronous stage 320-2 of the second clocked digital signal path circuit 310-2 is configured to cause the last synchronous stage 320-2 of the second clocked digital signal path circuit 310-2 to be reset, triggered by a reset level of the second clock signal applied at the second clock supply 311-2.

FIGS. 3a and 3b show the one (and only) clock generator 360 configured to provide a first clock signal 365-1 (clock frequency fclk1) to clock the last synchronous stage 320-1 of the first clocked digital signal path circuit 310-1 and a second clock signal 365-2 (clock frequency fclk1) to clock the last synchronous stage 320-2 of the second clocked digital signal path circuit 310-2.

In the examples according to FIGS. 3a and 3b the signal processing device may be configured such that the clock generator 360 in the useful data forwarding operating state is coupled to the first forward path 305-1 and the second forward path 305-2 and in the measuring operating state is decoupled from the first forward path 305-1 and the second forward path 305-2.

In other examples according to FIGS. 3a and 3b the first data signal provider 330-1 may be configured to bring, in the useful data forwarding operating state, the reset input 326-1 of the last synchronous stage 320-1 of the first clocked digital signal path circuit 310-1 into an inactive state, and in order to provide a predetermined logical value as the first data signal 335-1 in the measuring operating state. Further, the second data signal provider 330-2 may be configured to bring in the useful data forwarding operating state the reset input 326-2 of the last synchronous stage 320-2 of the second clocked digital signal path circuit 310-2 into an inactive state, and in order to provide a predetermined logical value as the second data signal 335-2 in the measuring operating state.

In other examples according to FIGS. 3a and 3b the signal processing device can be configured such that in the useful data forwarding operating state the first reverse path 307-1 is decoupled from the first forward path 305-1 and in the measuring operating state the first reverse path 307-1 is connected to the first forward path 305-1. Further the signal processing device 100 is configured such that in the useful data forwarding operating state the second reverse path 307-2 is decoupled from the second forward path 305-2 and the second reverse path 307-2 is decoupled from the second forward path 305-2 in the measuring operating state.

Thus, according to FIGS. 3a and 3b it can be switched between the useful data forwarding operating state and the measuring operating state, with the useful data forwarding operating state or the measuring operating state of a first switching position and/or a second switching position using switches that can be operated. In FIGS. 3a and 3b a first switching position, equivalent to the reference forwarding operating state, is marked "BZ1," while the second switching position, equivalent to the measuring operating state, is marked "BZ2."

Examples according to FIGS. 3a and 3b are based on the frequency measurement occurring via the transit time measurement, or the transit time difference measurement, because frequencies can be determined very precisely.

In FIGS. 3a and 3b an arrangement for measuring the transit time for a clock path is shown respectively. In the system, the actual frequency measuring device may also be used for both clock paths, when sufficient time is given in the system in order to allow performing the measurements successively.

In the following, additional details of the system shown in FIGS. 3a and 3b are explained.

In the examples, during the measuring of the signal transit time at the end of the clock path and/or the forward path pointing to the DCO or DAC, a path leading to the source and/or a reverse path may be connected. This path can be switched on or off, as needed, so that during the normal operation and/or during the useful data forwarding operating state no additional power consumption and no interference by additional activity develops.

For the measurement, the output of the respective reverse path can be formed at the clock source (clock generator) to the input of the path respectively leading thereto, perhaps via an additional inverter, so that one closed circuit each is formed. It is important that during a signal cycle inside the closed circuit the total number of inversions is odd, so that this overall composition forms a ring oscillator and oscillates with its natural frequency.

The respective natural frequency of an oscillation in the ring oscillator can be precisely measured by a frequency counter. From the respective frequency the respective period term and thus the respective overall cycle period Tges1 and/or Tges2 of the signal can be calculated by the ring. The respective overall cycle period results from the respective cycle period for the forward signal Tclk1 and/or Tclk2 and the respective cycle period T_reverse1 and T_reverse2 in the reverse path (e.g., Tges1=Tclk1+T_reverse1 and/or Tges1=Tclk2+T_reverse2).

When this method is applied for both paths to be measured it should be ensured that the periods T_reverse1 and T_reverse2 in the reverse paths are identical, to the extent possible. This can be achieved when in the reverse paths for matching reasons and/or adjustment reasons relatively large structures for lines (i.e., relatively large wire widths) and perhaps useful buffer stages (e.g., buffer stages 350-1, 350-2 in FIGS. 3a and 3b) are selected and they are supplied with identical operating parameters, to the extent possible.

When the period T_reverse1 is identical to T_reverse2, after the formation of the difference of Tges1 and Tges2 the difference remains of the periods in the forward paths (e.g., Δ=Tclk1−Tclk2).

Due to the fact that in the system it is not necessary to adjust the absolute signal periods but only the difference should be minimized the correct parameter can be precisely determined by this method. The difference (Δ) can be used in the exemplary embodiments as a foundation of adjusting phase selection multiplexers in a PHASE_SEL block (see, e.g., FIG. 6).

After the measurement of the periods and perhaps an adjustment of the phase relationship of clock signals to clock the arrangement shown in FIGS. 3a and/or 3b, in order to start normal operation, the reverse paths can be switched off and the inputs of the forward paths can once more be switched to the clock source and/or the clock generator 360 shown in FIGS. 3a and 3b.

When the measurement shall also consider the respective signal transit time from the final data register (final control signal register) to the actual switch element (local logistics and/or local logical element) determining the analog output parameter, according to other exemplary embodiments the final control signal register or at least one flip-flop (FF) can be switched transparent therefrom and/or particularly configured for the measurement, as described above. For this purpose, at least one FF (e.g., D-FF, D-Flip-Flop) of the final control signal register may include an asynchronous reset input ("low-active" when the FF is positively edge-triggered, "high-active" when the FF is negatively edge-triggered). During the measurement, for example, at the D-inlet this D-FF and/or at the data inlet to the last synchronous stage a constant "high-potential" and/or a logical one may be applied. In the function as a ring oscillator an increasing clock edge causes this logical "1" to relay to the D-FF output and/or to the output of the last synchronous stage, which then runs to the end of the local logic, here enters the reverse path, and ultimately reaches the reset input of the D-FF and/or the reset input of the last synchronous stage through the overall inversion inside the loop (ring) as a logical "0" and here causes a logical "0" at the D-FF output. This way, in spite of the D-FF in the loop an oscillation can be achieved and the signal transit time on the entire forward path can be included in the measurement.

By such a measurement of the frequency the frequency measurement device can principally be connected at any arbitrary location at the oscillating loop.

Figure 4A:
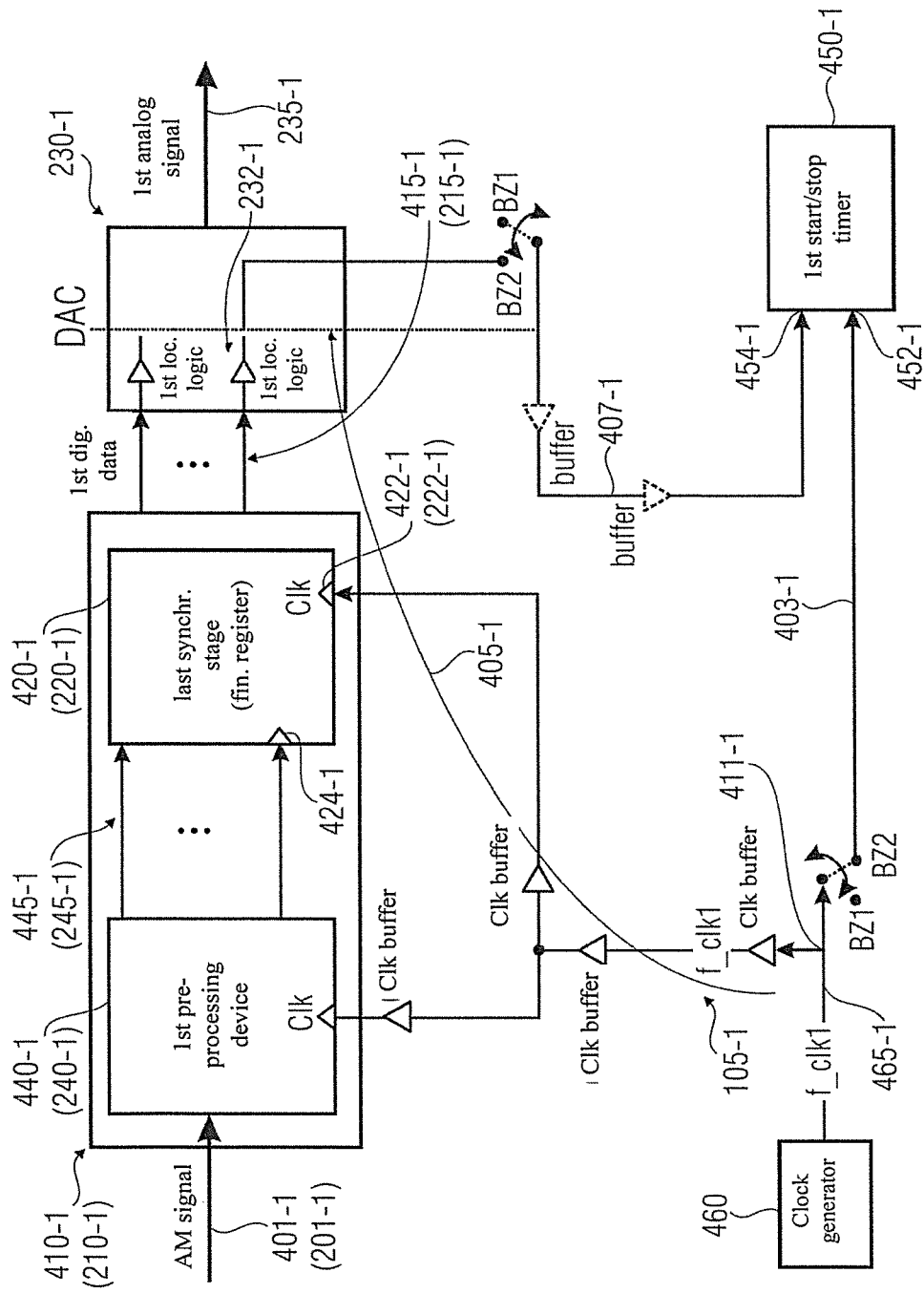
FIGS. 4a and 4b are block diagrams of a first and/or a second measuring path of the signal processing device according to FIG. 1 with one start/stop time measuring device each.
Figure 4B:
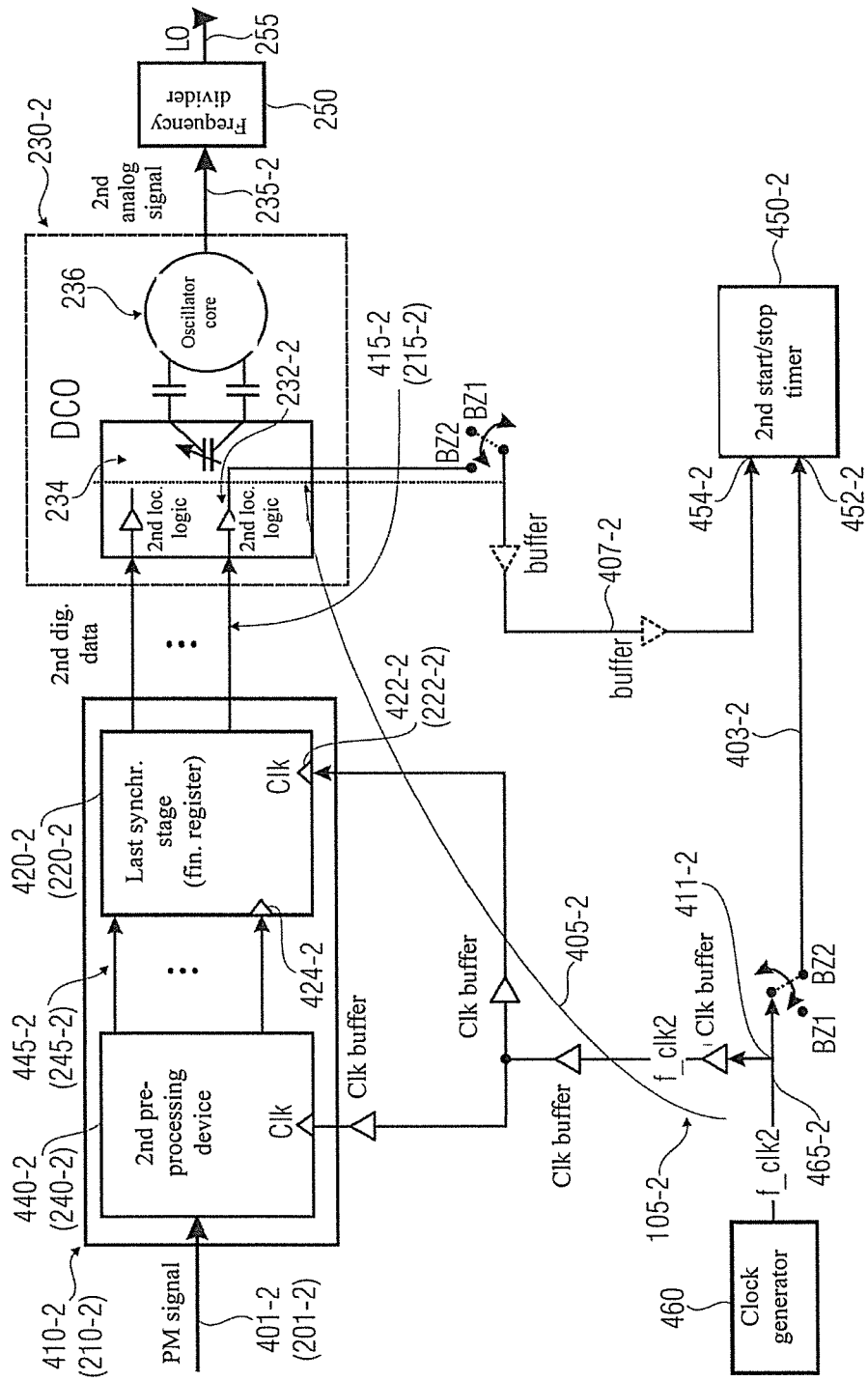

FIGS. 4a and 4b each show a block diagram of another exemplary embodiment of a first and/or a second measuring path 105-1, 105-2 of the signal processing device 100 according to FIG. 1 with a first and a second start-stop time measuring device 450-1, 450-2. The blocks 410-1, 420-1, 440-1 and/or 410-2, 420-2, 440-2 shown in FIGS. 4a and 4b are essentially equivalent to the blocks 210-1, 220-1, 240-1 and/or 210-2, 220-2, 240-2 shown in FIG. 2. In the exemplary embodiments according to FIGS. 4a and 4b the first measuring path 105-1 comprises a first forward path 405-1, wherein the first forward path 405-1 can be connected to a first reverse path 407-1. Further, the second measuring path 105-2 comprises a second forward path 405-2, wherein the second forward path 405-2 can be connected to a second reverse path 407-2.

With reference to FIGS. 1, 4a, and 4b the transit time difference measuring device 120 may comprise a first start/stop time measuring device 450-1 with a first start input 452-1 and a first stop input 454-1 and a second start/stop time measuring device 450-2 with a second start input 452-2 and a second stop input 454-2.

FIG. 4a shows that the first start input 452-1 of the first start/stop time 450-1 is connected to an input node 411-1 of the first forward path 405-1. Further, the first stop input 454-1 of the first start/stop time measuring device 450-1 is connected to the first reverse path 407-1.

FIG. 4b shows that the second start input 452-2 of the second start/stop time measuring device 450-2 is connected to an input node 411-2 of the second forward path 405-2. Further, the second stop input 454-2 of the second start/stop time measuring device 450-2 is connected to the second reverse path 407-2.

As shown in FIG. 4a, the first start input 452-1 of the first start/stop time measuring device 450-1 can be connected to the input node 411-1 of the first forward path 405-1 via a first reference line 403-1. Further, the second start input 452-2 of the second start/stop time measuring device 450-2 can be connected to the input node 411-2 via a second reference line 403-2.

In one example the first reference line 403-1 and the second reference line 403-2 may be configured to obtain identical signal periods along the first and along the second reference line.

The first clocked digital signal path circuit 410-1 shown in FIG. 4a may show a first pre-processing device 440-1, while the second clocked digital signal path circuit 410-2 shown in FIG. 4b may show a second pre-processing device 440-2. Here, the first pre-processing device 440-1 of the first clocked digital signal path circuit 410-1 may be configured to yield a first pre-processed data signal 445-1. Further, the second pre-processing device 440-2 of the second clocked digital signal path circuit 410-2 may be configured to yield a second pre-processed data signal 445-2.

In the examples according to FIGS. 4a and 4b the signal processing device may further comprise a clock generator 460, connected to the inlet hub 411-1 of the first forward path 405-1 and the inlet hub 411-2 of the second forward path 405-2. In particular, here the clock generator 460 may be configured to provide a first clock signal 465-1 (clock frequency fclk1) to clock a last synchronous stage 420-1 of a first clocked digital signal path circuit 410-1 (see FIG. 4a) and a second clock signal 465-2 (clock frequency fclk2) to clock a last synchronous stage 420-2 of the second clocked digital signal path circuit 410-2 (see FIG. 4b).

In the examples according to FIGS. 4a and 4b the last synchronous stage 420-1 of the first clocked digital signal path circuit 410-1 can be configured to trigger a relay of the first pre-processed data signal 445-1 provided by the first pre-processing device 440-1 to the output of the last synchronous stage 420-1 of the first clocked digital signal path circuit 410-1 by a clock edge of the first clock signal 465-1, which after passing the forward path 405-1 reaches the first clocked digital signal path circuit 410-1 at a first clock input 422-1 of the last synchronous stage 420-1 so that the first pre-processed data signal 415-1 relayed from the last synchronous stage 420-1 of the first clocked digital signal path circuit 410-1 reaches the first start/stop time measuring device 450-1 after passing the reverse path 407-1 at the first stop input 454-1.

Further, the last synchronous stage 420-2 of the second clocked digital signal path circuit 410-2 can be configured to trigger a relay of the preprocessed data signal 445-2 provided by the second pre-processing device 440-2 to the output of the last synchronous stage 420-2 of the second clocked digital signal path circuit 410-2 by a clock edge of the second clock signal 465-2, which after passing the forward path 405-2 reaches a second clock input 422-2 of the last synchronous stage 420-2 of the second clocked digital signal path circuit 410-2, so that the second pre-processed data signal 415-2 relayed from the last synchronous stage 420-2 of the second clocked digital signal path circuit 410-2 after passing the reverse path 407-2 reaches the second stop input 454-2 of the second start/stop time measuring device 450-2.

Thus, in the examples according to FIGS. 4a and 4b, in principle, a similar arrangement can be used with additional reverse paths as in FIGS. 3a and 3b. However, in FIGS. 4a and 4b the rings are not closed, but a pulse can be feed thereto at the respective input (input node 411-1, 411-2) of the forward path so that the delay between the forward pulse and the reverse pulse can be directly measured digitally using a transit time measuring device (e.g., TDC, Time-to-Digital-Converter). Another calculation and the further proceeding can occur as described in the context of FIGS. 3a and 3b.

In the examples according to FIGS. 4a and 4b it is not necessary that the final register (last synchronous stage) is converted. By appropriate data at the respective register input (data inputs 424-1, 424-2 of the final register) it can be ensured that in any case after an input clock a logical "1" pulse is fed from the register to the respective local logics and by the reverse path returns to the measuring point.

Due to the fact that here the transit time is measured directly it is advantageous that the measuring devices and/or start/stop time measuring devices at the input of the forward path and at the outlet of the reverse path in the systems to be measured in FIGS. 4a and 4b are each connected under the same conditions (e.g., identical line length, perhaps isolation buffers, etc.) so that the periods on the measuring connections cause no systematic off-set and/or no systematic deviation. The measuring devices and/or start/stop time measuring devices shall preferably be arranged in the proximity of the clock generating system and/or the clock generator.

In other exemplary embodiments (similar to the description in the context of FIGS. 3a and 3b) a jointly used time measuring device may be used. In other words, a joint alternating use of the two installations 450-1 and/or 450-2 (time measuring devices in FIGS. 4a and 4b) is possible in both paths, when the input lines (e.g., for the start/stop inputs 452-1, 454-1; 452-2, 454-2) are switched appropriately multiplexed to a measuring device.

Figure 4C:
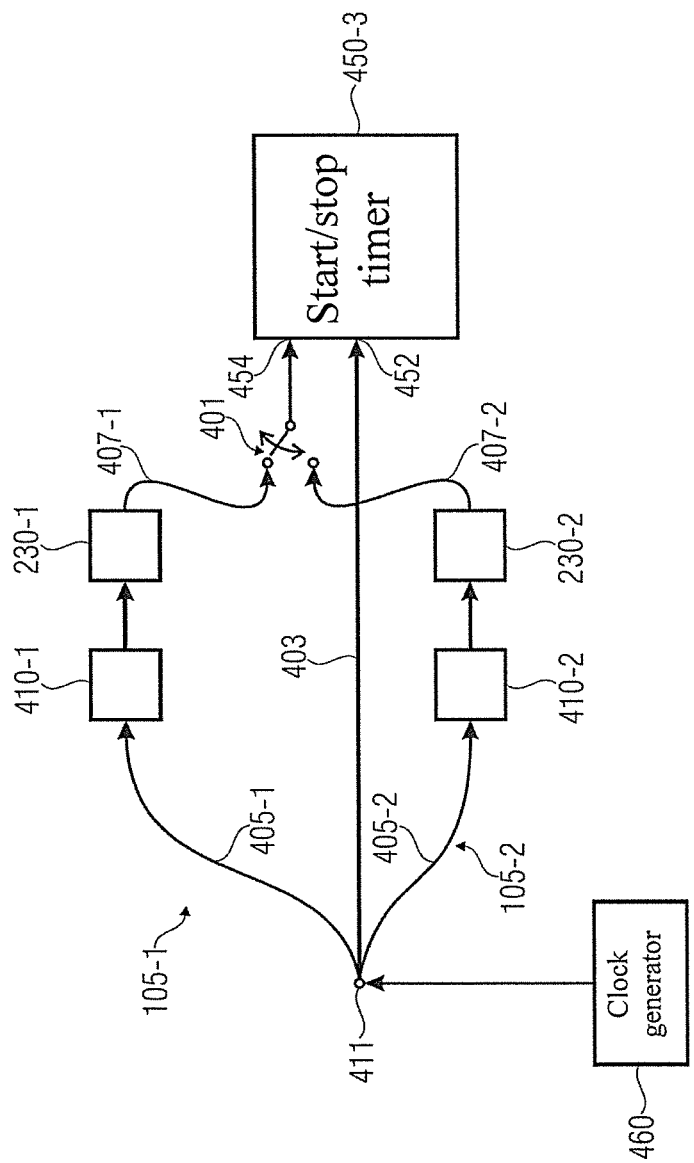
FIG. 4c is a block diagram of a time measuring device according to one example of the disclosure.

Accordingly, FIG. 4c shows a block diagram for the implementation of a commonly used time measuring device (start/stop time measuring device 450-3) according to an exemplary embodiment of the invention. FIG. 4c also shows the blocks 460 (clock generator), 410-1, 410-2 (first and second clocked digital signal path circuit) and 230-1, 230-2 (DAC and DCO). In the example shown in FIG. 4c the first measuring path 105-1 comprises the first forward path 405-1 and the first reverse path 407-1. Further the second measuring path 105-2 comprises the second forward path 405-2 and the second reverse path 407-2.

With reference to FIGS. 1 and 4c a transit time difference measuring device 120 may comprise a commonly used start/stop time measuring device 450-3 with a start input 452 and a stop input 454.

FIG. 4c shows that the start input 452 of the start/stop time measuring device 450-3 is connected via a reference line 403 to an input node 411. The input node 411 in turn is connected to the clock generator 460. The stop input 454 of the start/stop time measuring device 450-3 can, for example, be coupled via a switch 401 to the first reverse path 407-1 or to the second reverse path 407-2. The switch 401 may be configured to couple the reverse paths 407-1, 407-2 of the measuring paths 105-1, 105-2 each successively to the stop input 454 of the start/stop time measuring device 450-3 and, for example, to switch alternating back and forth between these paths.

This way, in the example shown in FIG. 4c the measurement (timing) in both measuring paths can be performed successively (for example alternating) with a common measuring device.

Alternatively the two reverse paths 407-1 and 407-2 can be switched directly to a commonly used time measuring device (transit time difference measuring device). This is possible such that the two reverse clocks and/or measuring paths show a common clock root (input node 411, connected to the clock generator 460) in their forward path (405-1, 405-2).

Figure 4D:
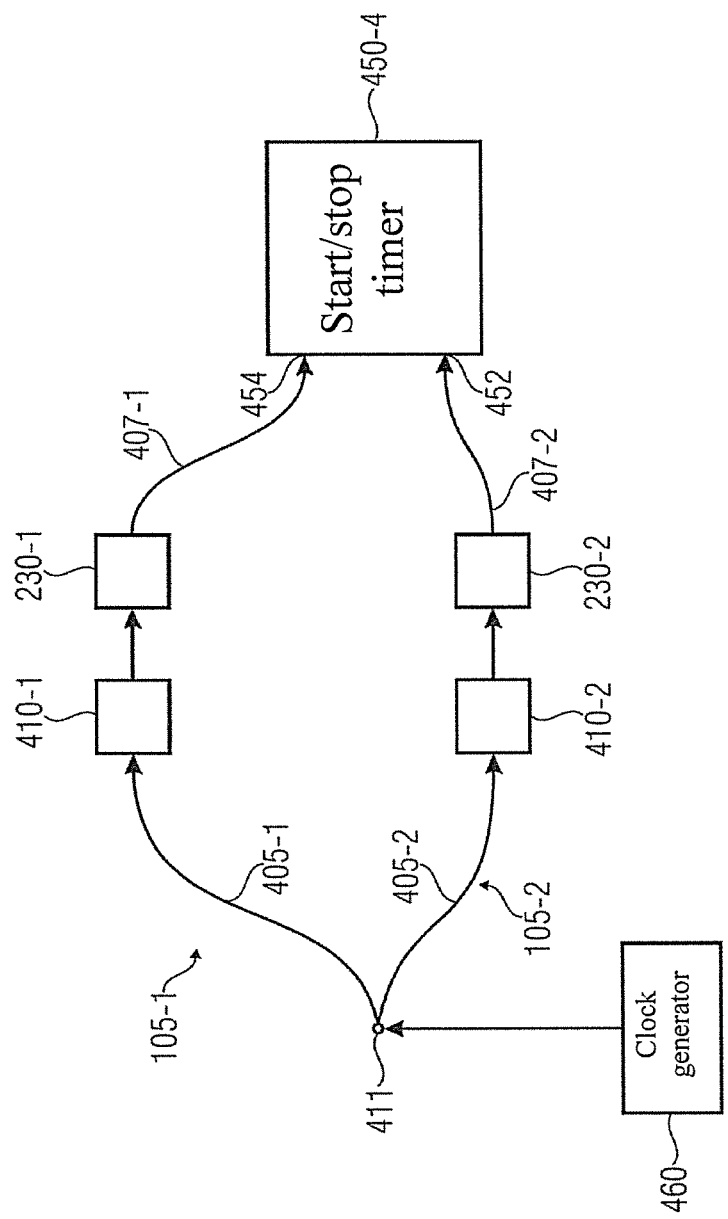
FIG. 4d is a block diagram of a time measuring device according to another example of the disclosure.

Accordingly, FIG. 4d shows a block diagram from the implementation of a commonly used time measuring device (start-top time measuring device 450-4) according to another example of the disclosure. FIG. 4d once more shows the blocks 460 (clock generator), 410-1, 410-2 (first and second clocked digital signal path circuit) and 230-1, 230-2 (DAC and DCO). In the example shown in FIG. 4d the first measuring path 105-1 comprises the first forward path 405-1 and the first reverse path 407-1. Further, the second measuring path 105-2 comprises the second forward path 405-2 and the second reverse path 407-2.

With reference to FIGS. 1 and 4d the transit time difference measuring device 120 comprises a commonly used start/stop time measuring device 450-4 with a start input 452 and a stop input 454.

FIG. 4d shows that the start input 452 of the start/stop time measuring device 450-4 is connected to the second reverse path 407-2 and the stop input 454 of the start/stop time measuring device 450-4 to the first reverse path 407-1. The measuring paths 105-1, 105-2 comprising the forward paths 405-1 and/or 405-2 and the reverse paths 407-1 and/or 407-2 are connected to an input node 411. The input node 411 in turn is connected to the clock generator 460. As shown in FIG. 4d, the two reverse paths and/or measuring paths are connected simultaneously to the stop input 454 and the start input 452 of the start/stop time measuring device 450-4.

Thus, in the example shown in FIG. 4d the measurement (timing) can be performed in both measuring paths simultaneously with a common measuring device.

Due to the fact that during the above-mentioned measurement no interference with the forward paths is necessary the measuring device and/or the transit time difference measuring device can also be switched on/off dynamically or permanently during the normal operation in order to allow a continuous or repeated measurement.

Figure 5:
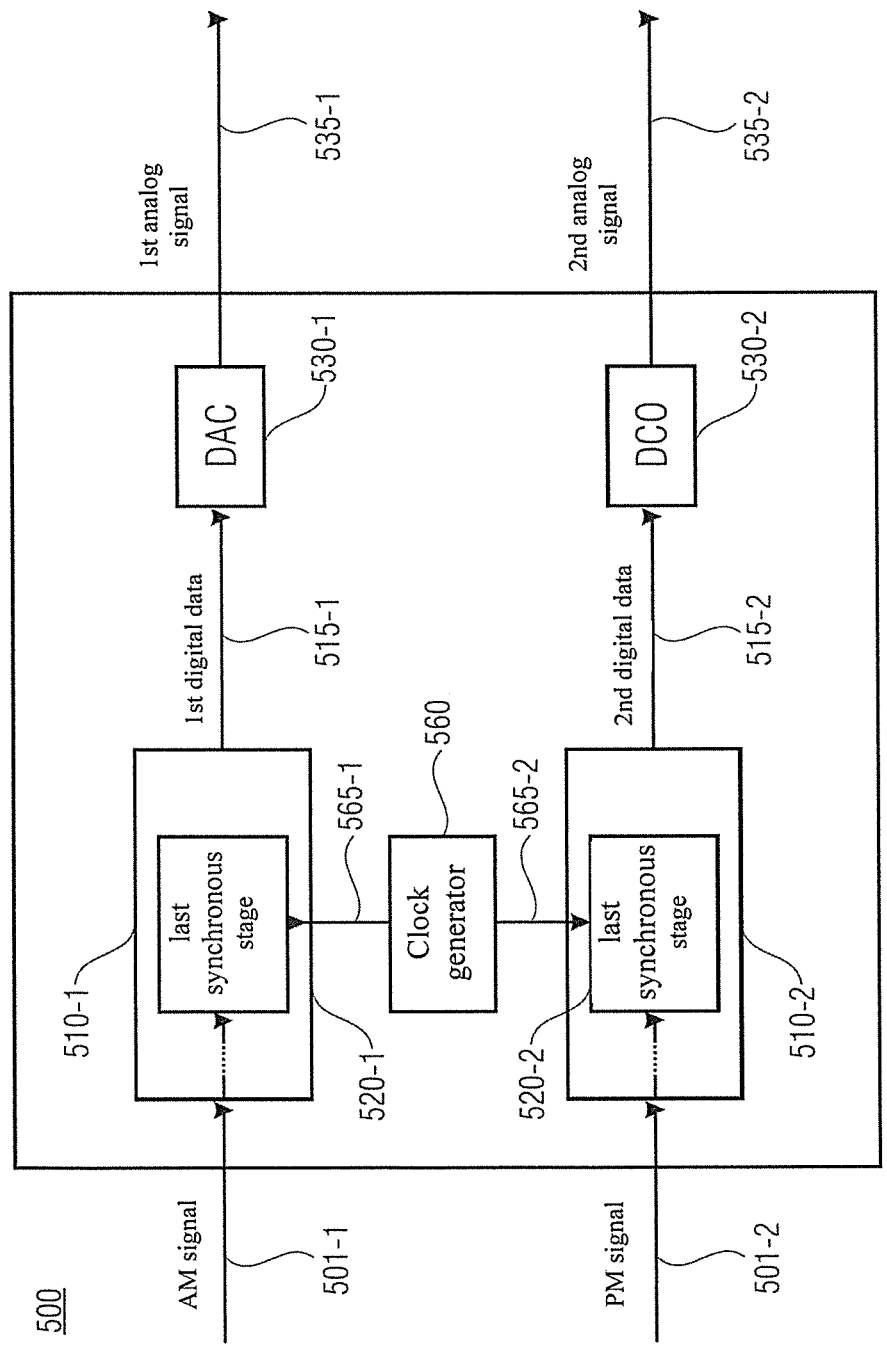
FIG. 5 is a block diagram of a signal processing device for providing a first analog signal and a second analog signal with a clock generator according to another example of the disclosure.

FIG. 5 shows a signal processing device 500 for providing a first analog signal 535-1 and a second analog signal 535-2 with a clock generator 560 according to another example of the disclosure. As shown in FIG. 5, the signal processing device 500 comprises a first clocked digital signal path circuit 510-1, a second clocked digital signal path circuit 510-2, and a clock generator 560. Here, the first clocked signal path circuit 510-1 is configured to yield first digital data 515-1 in order to provide the first analog signal 535-1. Further, the second clocked digital signal path circuit 510-2 is configured to provide the second analog signal 535-2.

In particular, the clock generator 560 is designed to provide a first clock signal 565-1 to clock a last synchronous stage 520-1 of the first clocked digital signal path circuit 510-1 and a second clock signal 565-2 to clock a last synchronous stage 520-2 of the second clocked digital signal path circuit 510-2.

In the example shown in FIG. 5 the clock generator 560 is configured to adjust a relative temporal position of clock edges of the first clock signal 565-1 and clock edges of the second clock signal 565-2 to yield a temporal synchronization of the first analog signal 535-1 and the second analog signal 535-2.

With reference to FIG. 5, the last synchronous stage 520-1 of the first clocked digital signal path circuit 510-1 of the signal processing device 500 may be configured to provide the first digital data 515-1 depending on an AM input signal 501-1. Further, the last synchronous stage 520-2 of the second clocked digital signal path circuit 510-2 is configured to provide the second digital data 515-2 depending on a PM input signal 501-2. Additionally, FIG. 5 shows that the signal processing device 500 further may comprise a DAC 530-1 and a DCO 530-2. Here, the DAC 530-1 can be configured to convert the first digital data 515-1 in order to yield the first analog signal 535-1. Further, the DCO 530-2 may be configured to convert the second digital data 515-2 in order to yield the second analog signal 535-2.

Figure 6:
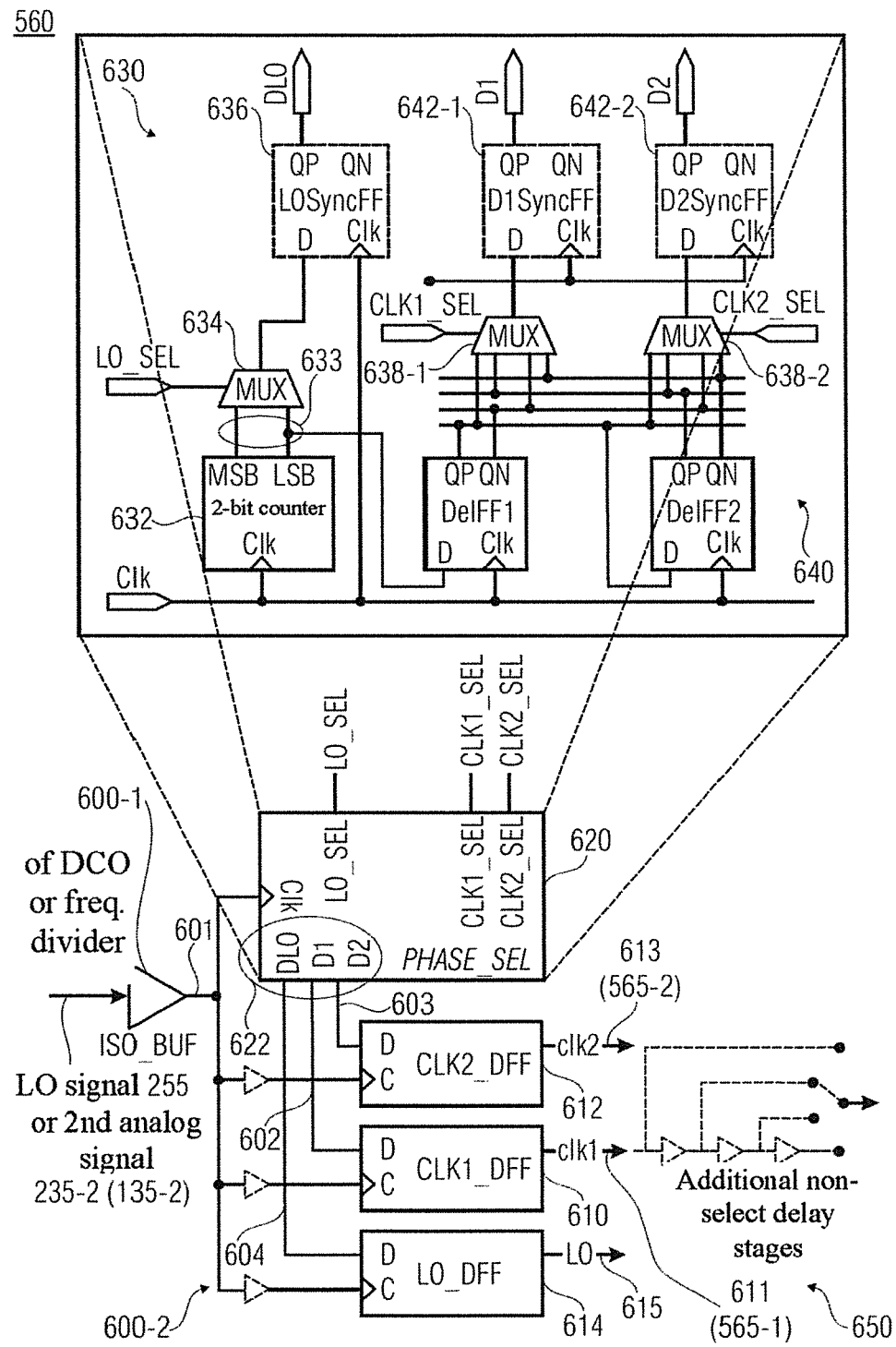
FIG. 6 is a block diagram of a clock generator of the signal processing device according to FIG. 5 with a clock generating flip-flop and a phase selector according to one example.

FIG. 6 shows a block diagram of an example of a clock generator 560 of the signal processing device 500 according to FIG. 5 with a clock generator flip-flop 610 and a phase selector 620. In particular, the phase selector 620 shown in FIG. 6 may be embodied to generate a control signal 602 which states at which clock edge of an input clock signal 601 the clock generator flip-flop 610 switches to generate an output clock signal 611.

FIG. 6 additionally shows another detail of the phase selector 620. In the example according to FIG. 6 the phase selector 620 may comprise a synchronous circuit 630 to generate the control signal 602. Here, flip-flops 640 of the synchronous circuit 630 of the phase selector 620 may be embodied such that a signal delay therein is, for example, at least ten times greater than the signal delay of the clock generator flip-flop 610. This makes it possible in an advantageous manner to distribute the signal generation to a power-saving low-performance and/or non power-critical part (flip-flops in the phase selector) and a high-performance and/or power-critical part (clock generation flip-flop).

As shown in FIG. 6 the clock generator 560 may comprise another clock generator flip-flop 612. Further, the phase selector 620 may be configured to generate another control signal 603, which states in which clock edge of an input clock signal 601 the other clock generator flip-flop 612 switches in order to generate another output clock signal 613.

Additionally, in the example according to FIG. 6 the clock generator 560 may comprise a LO signal-generating flip-flop 614. Further, the phase selector 620 may be configured to generate a control signal 604 for the LO signal-generating flip-flop 614 which states at which clock edge of an input clock signal 601 the LO signal-generating flip-flop 614 switches in order to generate an output LO signal 615.

The output clock signal 611 generated by the clock generator flip-flop 610 and the other output clock signal 613 generated by the other clock generator flip-flop 612 in FIG. 6 are essentially equivalent to the first clock signal 565-1 to clock the last synchronous stage 520-1 of the first clocked digital signal path circuit 510-1 and the second clock signal 565-2 to clock the last synchronous stage 520-2 of the second clocked digital signal path circuit 510-2 in FIG. 5. In FIG. 6 the output clock signal 611 is marked "clk1," while the other output clock signal 613 is marked "clk2." The output clock signals 611, 613 generated by the clock generator 560 can be used to adjust the last synchronous stages 520-1, 520-2 shown in FIG. 5 separately and/or independent from each other in order to yield the temporal synchronization of the first and second analog signals 535-1, 535-2.

In the following the functionality of the clock generator 560 and/or the clock generation system shown in FIG. 6 is explained in greater detail. The arrangement shown in FIG. 6 can be switched, depending on the situation, either downstream in reference to the frequency divider 250 shown in FIG. 2 or directly replace it as a LO-generating circuit. In one example the frequency of the input signal (LO signal 255 or second analog signal 235-2) for the clock generator should be four times higher than the desired frequency of the output clock signal 611, 613 (clk1, clk2).

In FIG. 6 all signals are marked one-phase for better visibility. In general, in concrete implementations they may also be embodied entirely or partially as differential signals. The oscillator signal (e.g., LO signal 255) is amplified by a buffer (buffer, driver stage) 600-1 (ISO_BUF), which simultaneously represents the reverse isolation of the clock generation system for the oscillator core (e.g., oscillator core 236). The buffer 600-1 can here be connected galvanically to the oscillator and/or DCO or be connected thereto by a capacitive or inductive coupling.

The output of the buffer 600-1 first serves a phase selector 620 (PHASE_SEL), which does not require good phase noise. The outputs 622 of the phase selector 620 serve as D inputs for the control signals 602, 603 of the driver flip-flops (clock generator flip-flops 610, 612) for generating the clocks and/or clock signals 611, 613 and the LO signal 615 (CLK1_DFF, CLK2_DFF and LO_DFF).

The clock inputs (C inputs) of the D-flip-flops (D-FFs) and/or the clock generator flip-flops 610, 612 can be supplied amplified similar to the phase selector 620 by the oscillator buffer 600-1 and perhaps also by other buffers 600-2 indicated in FIG. 6. The D-flip-flops 610, 612, 614 can be sized according to the noise requirements to the clock and LO signals 611, 613, 615.

The phase selector 620 can provide the signal forms with low power consumption for the clock and LO signals 611, 613, 615, which then can be synchronized in the D-FFs CLK1_DFF 610, CLK2_DFF 612, and LO_DFF 614 with the oscillator frequency and thus be generated with little additional cascading noise contributions.

The phase selector 620 comprises internally a 2-bit wide counter 632, which at its two outputs 633 provides one signal divided by two and one divided by four in reference to the oscillator frequency. By a multiplexer 634 one of the two signals can be selected, perhaps synchronized in another LOSyncFF flip-flop 636 (this may only be the case if the counter 632 and the multiplexer 634 show excessive signal transit times in reference to the oscillator period) and then be used as a D signal for the D-flip-flop LO_DFF 614 arranged outside the phase selector 620 for the LO signal generation. Using the multiplexer 634 it can be selected if the LO signal 615 is an oscillator signal divided, for example, by two or by four.

The oscillator signal divided by four can also be fed to a serially switched circuit of two additional D-flip-flops 640 (DelFF1 and DelFF2) clocked by the oscillator frequency. The non-inverted and inverted outputs of these two D-FFs can be applied to one multiplexer 638-1, 638-2 each, by which any desired phasing can be selected. The multiplexer outputs can in turn be synchronized (this may only be the case in long signal transit times by multiplexers 638-1, 638-2, etc.) with one additional D-flip-flop 642-1, 642-2 each in order to then feed the D inputs of the flip-flops (FFs) CLK1_DFF and CLK2_DFF 610, 612.

By the appropriate setting of the multiplexers 638-1, 638-2 the phase positions of the clocks and/or the clock signals 611, 613 in reference to each other can be adjusted in 90-degree steps and/or in quarters of the oscillator period.

Additionally, the phase-locked and the fixed frequency relationship of all signals in reference to each other causes an exact predictability of the signal precursors for the modulation of the oscillator frequency and the DAC output parameter so that perhaps a respective pre-conditioning can be performed in the digital part of the system.

If according to one example between the two positive edge-triggered D-FFS DelFF1 and DelFF2 and additionally negatively edge-triggered D-FFs can be inserted downstream in reference to DelFF2 in FIG. 6, the FFs CLK1_DFF and CLK2_DFF react to both clock edges, and instead of the 4:1 multiplexers 638-1, 638-2, 8:1-multiplexers can be used, the resolution that can be achieved can be increased further by a factor of 2.

In other examples the arrangement is not limited to two clock signals. Using additional multiplexers, synchronization stages, and additional flip-flops CLKx_DFFs additional useful clock signals can be generated.

When the achievable precision and/or the granularity is insufficient, in other examples, an additional period can be adjusted by a switched, adjustable number of additional numbers of drivers/delay stages 650 inserted in at least one of the clock lines, which then, however, due to exterior influences, shows a lower reproducibility than the precision of the direct CLKx_DFF outputs caused by the clock phase.

With reference to FIGS. 5 and 6 the clock-generating block and/or clock generator 560 cannot simultaneously be placed in the proximity of the oscillator (DCO) 530-2 and the DAC 530-1 so that the greater lengths of lines can be compensated by an additional insertion of buffer stages into the clock lines (between the clock generator 560 and the last synchronous stages 510-1 and/or 510-2), causing a signal delay depending on the process, temperature, and voltage supplied. The signal transit time within the control for DCO and DAC (see FIG. 2) is also respectively added to the signal delay. Due to the fact that the clock paths typically show a different environment and/or operating conditions their delay to each other can be correlated only to a limited extent. Examples of the disclosure, however, allow that, depending on the operating case, another optimal relative phase position of the clocks can be adjusted in reference to each other, in order to compensate transit differences.

In other examples the signal periods can be determined at least once prior to operation and from the difference an optimal adjustment of the multiplexers 634, 638-1, 638-2 in the phase selector 630 and perhaps the number of additional driver stages switched can be set from their difference via a fixed algorithm.

Figure 7:
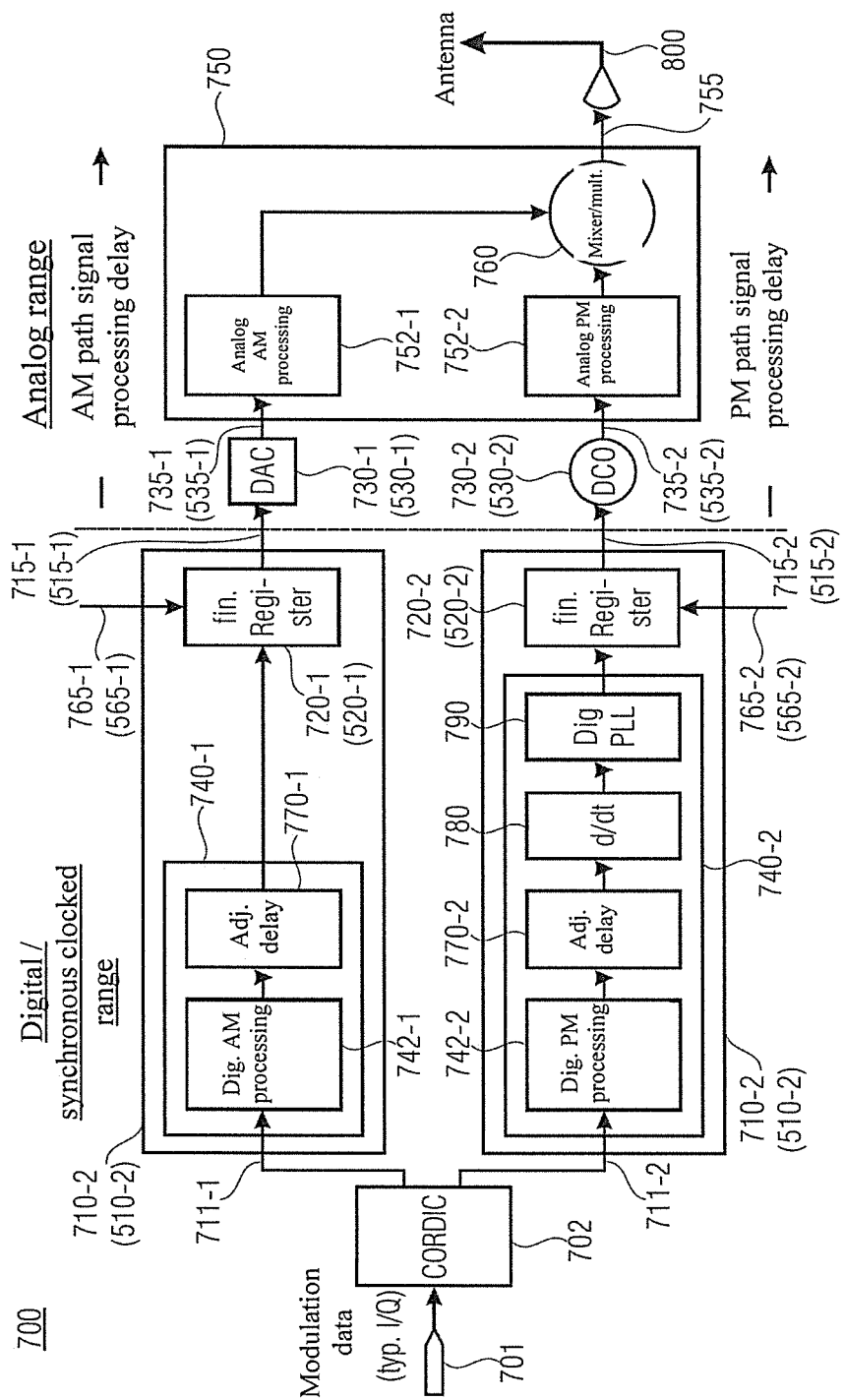
FIG. 7 is a block diagram of a signal processing device with a first and a second adjustable delay unit to adjust a digital delay according to one example.

FIG. 7 shows a block diagram of an example of a signal processing device 700 with a first and a second adjustable delay device 770-1, 770-2 to adjust a digital delay. The blocks 710-1, 720-1, 730-1, and/or 710-2, 720-2, 730-2 shown in FIG. 7 are essentially equivalent to the blocks 510-1, 520-1, 530-1, and/or 510-2, 520-2, 530-2 shown in FIG. 5. As shown in FIG. 7, the signal processing device 700 comprises a CORDIC algorithm block 702, a first clocked digital signal path circuit 710-1, a second clocked digital signal path circuit 710-2, a DAC 730-1, a DCO 730-2, a combiner 750, and an antenna 800. Here, the CORDIC algorithm block 702, the first clocked digital signal path circuit 710-1, and the second clocked digital signal path circuit 710-2 can operate in a digital/synchronized clocked range, while the DAC 730-1, the DCO 730-2, and the combiner 750 operate in the analog range.

The CORDIC algorithm block 702 is configured to process modulation data 701 (e.g., I/Q data) in order to obtain an AM input signal 711-1 (amplitude information) and a PM input signal 711-2 (phase information). A first clocked digital signal path circuit 710-1 is configured to yield first digital data 715-1 for the provision of a first analog signal 735-1. Further, the second clocked digital signal path circuit 710-2 is configured to yield second digital data 715-2 for the provision of a second analog signal 735-2. The DAC 703-1 is configured to convert the first digital data 715-1 supplied by the first clocked digital signal path circuit 710-1 into the first analog signal 735-1. Further, the DCO 730-2 is configured to convert the second digital data 715-2 supplied by the second clocked digital signal path circuit 710-2 into the second analog signal 735-2.

In the example shown in FIG. 7 the combiner 750 is configured to combine the first analog signal 735-1 and the second analog signal 735-2 to obtain a combined output signal 755.

In other examples the signal processing device 700 may further comprise a clock generator, configured to provide a first clock signal 765-1 to clock a last synchronous stage 720-1 (final register) of the first clocked digital signal path circuit 710-1 and a second clock signal 765-2 to clock a last synchronous stage 720-2 (final register) of the second clocked digital signal path circuit 710-2.

As described above, the clock generator can be configured to adjust a relative temporal position of clock edges of the first clock signal 765-1 and clock edges of the second clock signal 765-2 in reference to each other in order to achieve a temporal synchronization of the first analog signal 735-1 and the second analog signal 735-2.

The first clocked digital signal path circuit 710-1 operating in the digital and/or synchronous clocked range comprises a first pre-processing device 740-1 and a last synchronous stage 720-1 (final register), while the second clocked digital signal path circuit 710-2 operating in the digital and/or synchronous clocked range comprises a second pre-processing device 740-2 and a last synchronous stage 720-2 (final register). The last synchronous stages 720-1, 720-2, and/or final registers of the first and the second clocked digital signal path circuit 710-1, 710-2 can be clocked separately from each other via the first and the second clock signal 765-1, 765-2.

The first pre-processing device 740-1 of the first clocked digital signal path circuit 710-1 comprises a digital AM processing block 742-1 and a first adjustable delay unit 770-1. Further, the second pre-processing device 740-2 of the second clocked digital signal path circuit 710-2 comprises a digital PM-processing block 742-2, a second adjustable delay unit 770-2, a differentiator (d/dt) 780, and a digital PLL 790. The digital AM processing block 742-1 is configured to process the AM input signal 711-1, while the digital PM processing block 742-2 is configured to process the PM input signal 711-2.

In the example shown in FIG. 7 the first adjustable delay unit 770-1 of the first clocked digital signal path circuit 710-1 can be configured to adjust a first digital delay. Further, the second adjustable delay unit 770-2 of the second clocked digital signal path circuit 710-2 can be configured to adjust a second digital delay. In one example the first digital delay and the second digital delay can only be adjusted in the steps of a clock period of the first clock signal 765-1 and/or the second clock signal 765-2.

Contrary thereto, the clock generator (e.g., the clock generator 560 in FIG. 5) may be configured to adjust the relative temporal position of clock edges of the first clock signal 765-1 and the clock edges of the second clock signal 765-2 with a resolution smaller than one clock period of the first clock signal 765-1 or the second clock signal 765-2.

In other words, the first and the second digital delay can be adjusted with the first and the second adjustable delay unit 770-1, 770-2 only coarsely, while the relative temporal position of clock edges of the first clock signal 765-1 and clock edges of the second clock signal 765-2 for the two last synchronous stages can be adjusted more finely (i.e., with a resolution in the sub-period range).

Within the second clocked digital signal path circuit 710-2 the differentiator 780 may be configured to differentiate the delayed signal provided by the second adjustable delay unit 770-2. Further, the digital PLL 790 of the second clocked digital signal path circuit 710-2 can be configured to modulate the signal supplied by the differentiator 780 in order to provide a modulated signal for the DCO 730-2.

As shown in FIG. 7, the combiner 750 operating in the analog range may comprise a mixer or a multiplexer 760. Further, the combiner 750 may comprise an analog AM processing block 752-1 and an analog PM processing block 752-2. Here, the analog AM processing block 752-1 may be configured to further process the first analog signal 735-1 provided by the DAC 730-1 and provide the further processed signal for the mixer and/or multiplexer 760. Further, the analog PM processing block 752-2 may be configured to further process the second analog signal 735-2 provided by the DCO 730-2 and provide the further processed signal for the mixer and/or multiplexer 760. The mixer/multiplexer 760 shown in FIG. 7 may be configured to mix and/or multiply the further processed signals provided by the analog AM processing block 752-1 and the analog PM processing block 752-2 in order to yield as a combined output signal 755 a mixed and/or multiplied output signal. The combined output signal 755 can finally be transmitted via an antenna 800.

Summarizing FIG. 7 shows a principle arrangement of the system according to one example of the disclosure. The input-side modulation information 701 (e.g., modulation data of the type I/Q, I="inphase," Q="quadrature phase") can be separated in a CORDIC ("Coordinate Rotation Digital Computer") algorithm block 702 into amplitude and phase information 711-1, 711-2, and then separate signal processing chains (e.g., filters, amplitude adjustments, etc.) are passed. The phase information 711-2 can be differentiated with a differentiator 780 and ultimately serve to modulate a PLL 790 with a frequency-controlled oscillator accordingly such that the oscillator output shows the desired phase modulation.

The amplitude information 711-1 can be combined, after passing other analog signal processing blocks, in a mixer and/or multiplexer 760 with the phase-modulated so-called LO signal (perhaps frequency-divided oscillator output) to form a transmission signal, for example, according to equation (1).

In the implementation of the architecture the switching blocks shown in FIG. 7 may represent synchronous clocked digital circuits (see FIG. 2), except for the oscillator core (730-2) and the amplitude signal generation in DAC (730-1).

For a correct operation of the signal processing device 700 and/or the polar modulator architecture it is important that at the multiplexer 760 (MIXER) the further processed amplitude signal and the further processed frequency signal precisely coincide temporarily. An advantageous tolerance is set here, for example, in the range of less than one nanosecond.

With reference to FIGS. 2 and 7, when simultaneously the AM and the PM signals are relayed to the output of the digital part, the following conditions shall be complied with:

$$n2 \cdot Tclk2 + Tprop2 = n1 \cdot Tclk1 + Tprop1.$$

Due to the fact that n2 and n1 are predetermined in a fixed manner by the switching of DCO and DAC and not considerably distinguished due to the similarity of the switching function in DCO and DAC it is useful to select the parameters Tclk2 and Tclk1 identically and as small as possible in the examples, i.e., the DCO and DAC shall be clocked with the same frequency, as high as possible (in serial installations for mobile radio systems, for example, in the GHz range). The different values of n2 and n1 can be considered for the calculation of the AM and PM-information already in the synchronous digital part, i.e., the calculated values may be calculated appropriately off-set right from the start and be issued with a usually considerably lower clock rate fclk_dig as fclk2 and/or fclk1.

Due to the fact that fclk_dig is usually smaller than fclk2 and/or fclk1 it is relatively difficult to off-set the AM and PM signals in the digital part by fractions of a nanosecond in a calculated fashion. Examples of the disclosure, however, allow at a granularity in the nanosecond range additionally to compensate the remaining signal off-set by the lateral latency and also by the analog latencies Tprop2-Tprop1.

Furthermore, the examples of the disclosure provide the possibility of fulfilling certain technical system and switching requirements by not only adjusting the phase positions of the LO signal and fclk1 (clock of the AM signal DAC) in a fixed manner in reference to each other but also adjusting them variably in order after repeated activation of the system to uphold the same synchronization in the system.

Although some aspects have been described in the context of a device it shall be understood that these aspects also represent a description of the respective method, so that a block or a component of a device shall also be understood as a respective processing step or a feature of a processing step. Similar thereto, aspects that were described in the context of a processing step or as said step also represent a description of a respective block or detail or feature of a respective device.

Examples of the disclosure provide a system to generate different clocks and/or clock signals (CLK1, CLK2) and a LO signal, which can also be considered a clock, wherein the system can be used in a polar modulator for UMTS and similar broadband transmission systems and wherein their generation can be separated from each other.

Additionally, examples generate a clock generation system, which is so flexible that the mutual phase position of the generated clocks can be programmed in a variable fashion in order to flexibly react to processing-, temperature-, and voltage supply-related different values of Tprop2-Tprop1, if applicable. Furthermore, by the use of the system according to the disclosure a power consumption can be achieved as low as possible, particularly in mobile applications. Furthermore, a certain spectral purity of the generated clocks and the LO signal can be ensured.

Examples of the disclosure create a clock generation system, which provides based on an oscillator signal a LO signal of either half or one-quarter frequency and simultaneously two additional clock signals with a quarter of the oscillator frequency, the phase position of which in reference to each other and in reference to the LO signal can be off-set by an integer multiple of the oscillation periods. Using an oscillator oscillating, for example, at 4 GHz the clock phases can therefore be off-set in reference to each other in 250 ps intervals.

Examples of the disclosure allow that the analog transit times of the clocks in reference to the analog circuit blocks DCO and DAC can be measured in order to achieve with the help of adjustable phase positions a compensation of the transit times as optimal as possible.

Examples of the disclosure provide a concept of how the signal transit times can be measured on the clock supplies to the final register in the DCO and the DAC and/or perhaps even including the transit times in the signal paths inside the DCO and/or DAC-analog part.

Furthermore, the examples of the disclosure provide an option of dividing the signal generation into a low-current, non-performance-critical part, and a performance-critical part.

Summarizing, the examples of the disclosure provide the option of precisely adjusting the relative phase position of two or more clock signals and/or a local oscillator signal.

In general, examples of the disclosure provide a concept to detect and/or measure the differences of analog signal transit times in divided clock systems.

While this disclosure has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A signal processing device for providing a first analog signal and a second analog signal comprising the following features:
    a first clocked digital signal path circuit, configured to yield first digital data for providing the first analog signal;
    a second clocked digital signal path circuit, configured to yield second digital data for providing the second analog signal;
    a transit time difference measuring device configured to yield a transit time difference measuring signal describing a difference between a signal transit time along a first measuring path and a signal transit time along a second measuring path,
    with the first measuring path comprising a first clock supply configured to supply a first clock signal configured to clock one or more of a plurality of stages of the first clocked digital signal path circuit, and with the second measuring path comprising a second clock supply configured to supply a second clock signal configured to clock one or more of a plurality of stages of the second clocked digital signal path circuit.

2. The signal processing device according to claim 1, in which the first clocked digital signal path circuit comprises an allocated last synchronous stage with a first clock input for a first clock signal, and the second clocked digital signal path circuit comprises an allocated last synchronous stage with a second clock input for a second clock signal;

wherein the first clock supply of the first measuring path is connected to the first clock input of the last synchronous stage of the first clocked digital signal path circuit, and wherein the second clock supply of the second measuring path is connected to the second clock input of the last synchronous stage of the second clocked digital signal path circuit.

3. The signal processing device according to claim 1, in which the first clocked digital signal path circuit comprises an allocated last synchronous stage with a first clock input for a first clock signal, and the second clocked digital signal path circuit comprises an allocated last synchronous stage with a second clock input for a second clock signal;

wherein the signal processing device further comprises a digital-to-analog converter (DAC) with a first local logical element, which is configured to convert the first digital data yielded by the first clocked digital signal path circuit into the first analog signal, and comprises a digitally controlled oscillator (DCO) with a second logical element, configured to convert the second digital data yielded by the second clocked digital signal path circuit into the second analog signal;

with the first measuring path comprising a first signal path from an output of the last synchronous stage of the first clocked digital signal path circuit to an output of the first local logical element of the digital-to-analog converter (DAC), and with the second measuring path comprising a second signal path from an output of the last synchronous stage of the second clocked digital signal path circuit to an output of the second local logical element of the digitally controlled oscillator (DCO).

4. The signal processing device according to claim 1, in which the first measuring path comprises a first forward path, wherein the first forward path can be connected to a first reverse path, so that a first closed ring is formed, the second measuring path comprises a second forward path, wherein the second forward path is selectively connected to a second reverse path so that a second closed ring is formed;

wherein the signal processing device is configured such that the first forward path and the first reverse path are part of a first ring oscillator when the first ring is closed, and such that the second forward path and the second reverse path are part of a second ring oscillator when the second ring is closed; and with the transit time difference measuring device comprising a frequency measuring device configured to successively or simultaneously measure a frequency of an oscillation in the first ring oscillator and a frequency of an oscillation in the second ring oscillator; and with the transit time difference measuring device being configured to determine, based on the first measured frequency and on the second measured frequency, a difference between a signal transit time along the first forward path and a signal transit time along the second forward path.

5. The signal processing device according to claim 4, in which the first forward path or the first reverse path comprises at least one inverter so that the number of inverters in the first closed circuit is odd, and the second forward path or the second reverse path comprises at least one inverter so that the number of inverters in the second closed circuit is odd.

6. The signal processing device according to claim 4, in which the first clocked digital signal path circuit comprises a last synchronous stage with a first clock input for a first clock signal, and the second clocked digital signal path circuit comprises a last synchronous stage with a second clock input for a second clock signal;

with the first clock supply of the first forward path being connected to the first clock input of the last synchronous stage of the first clocked digital signal path circuit, and with the second clock supply of the second forward path being connected to the second clock input of the last synchronous stage of the second clocked digital signal path circuit;

with the signal processing device further comprising a first data signal provider configured to provide a first data signal, and with the first data signal provider being configured to provide the first data signal in a useful data forwarding operating state depending on useful data describing the first analog signal and to provide a predetermined logical value as a first data signalin a measuring operating state, a second data signal provider configured to provide a second data signal;

with the second data signal provider being configured to provide the second data signal in a useful data forwarding operating state depending on useful data describing the second analog signal and to yield in a measuring operating state a predetermined logical value as a second data signal, with the last synchronous stage of the first clocked digital signal path circuit comprising a first data input connected to the first data signal provider and a first reset input that can be connected to the first clock supply of the first forward path, and with the last synchronous stage of the second clocked digital signal path circuit comprising a second data input connected to the second data signal provider, and a second reset input that can be connected to the second clock supply of the second forward path;

with the last synchronous stage of the first clocked digital signal path circuit being configured to trigger a relay of a logical value applied at the first data input to the output of the last synchronous stage of the first clocked digital signal path circuit through the clock edge of the first clock signal, occurring at the first clock input of the last synchronous stage of the first clocked digital signal path circuit, and with the last synchronous stage of the second clocked digital signal path circuit being configured to trigger a relay of the logical value applied at the second data input to the output of the last synchronous stage of the second clocked digital signal path circuit by a clock edge of the second clock signal occurring at the second clock input of the last synchronous stage of the second clocked digital signal path circuit;

with the last synchronous stage of the first clocked digital signal path circuit being configured to cause a reset of the last synchronous stage of the first clocked digital signal path circuit in response to the reset signal level of the first clock signal applied at the first clock supply; and with the last synchronous stage of the second clocked digital signal path circuit being configured to cause a reset of the last synchronous stage of the second clocked digital signal path circuit in response to a second reset signal level of the second clock signal applied at the second clock supply.

7. The signal processing device according to claim 6, which further comprises a clock generator configured to provide a first clock signal to clock the last synchronous stage of the first clocked digital signal path circuit and a second clock signal to clock the last synchronous stage of the second clocked digital signal path circuit, with the signal processing device being designed such that in a measuring operating state, the clock generator is coupled to the first forward path and in a useful data forwarding operating state, the second forward path and is decoupled from the first forward path and the second forward path;

with the first data signal provider being configured to bring the reset input of the last synchronous stage of the first clocked digital signal path circuit into an inactive state in the useful data forwarding operating state, and to provide a predetermined logical value as a first data signal in the measuring operating state;

with the second data signal provider being configured to bring the reset input of the last synchronous stage of the second clocked digital signal path circuit into an inactive state in the useful data forwarding operating state, and to provide a predetermined logical value as a second data signal in the measuring operating state;

with the signal processing device being designed such that in the useful data forwarding operating state the first reverse path is decoupled from the first forward path and in the measuring operating state the first reverse path is coupled to the first forward path, and with the signal processing device being configured such that in the useful data forwarding operating state the second reverse path is decoupled from the second forward path and in the measuring operating state the second reverse path is coupled to the second forward path.

8. The signal processing device according to claim 1, in which the first measuring path comprises a first forward path wherein the first forward path can be connected to a first reverse path, and the second measuring path comprises a second forward path wherein the second forward path can be connected to a second reverse path;

wherein the transit time difference measuring device comprises a first start/stop time measuring device with a first start input and a first stop input and a second start/stop time measuring device with a second start input and a second stop input, with the first start input of the first start/stop time measuring device being connected to an input node of the first forward path, and with the second start input of the second start/stop time measuring device being connected to an input node of the second forward path;

with the first stop input of the first start/stop time measuring device being connected to the first reverse path, and with the second stop input of the second start/stop time measuring device being connected to the second reverse path;

with the first clocked digital signal path circuit providing a first pre-processing device configured to yield a first pre-processed data signal, and with the second clocked digital signal path circuit providing a second pre-processing device configured to yield a second pre-processed data signal;

with the signal processing device further comprising a clock generator connected to the input node of the first forward path and the second forward path, with the clock generator being configured to provide a first clock signal to clock a last synchronous stage of the first clocked digital signal path circuit and a second clock signal to clock a last synchronous stage of the second clocked digital signal path circuit;

with the first start/stop time measuring device being configured to start a time measurement in response to a clock edge of the first clock signal, and with the second start/stop time measuring device being configured to start time measurement in response to a clock edge of the second clock signal;

with the last synchronous stage of the first clocked digital signal path circuit being configured to trigger a relay of the first pre-processed data signal provided by the first pre-processing device to the output of the last synchronous stage of the first clocked digital signal path circuit by a clock edge of the first clock signal, which after passing the forward path reaches a first clock input of the last synchronous stage of the first clocked digital signal path circuit, so that the first pre-processed data signal relayed from the first synchronous stage of the first clocked digital signal path circuit after passing the reverse path reaches the first stop input of the first start/stop time measuring device, and with the last synchronous stage of the second clocked digital signal path circuit being configured to trigger a relay of the second pre-processed data signal provided by the second pre-processing device to the output of the last synchronous stage of the second clocked digital signal path circuit by a clock edge of the second clock signal, which after passing the forward path reaches a second clock input of the last synchronous stage of the second clocked digital signal path circuit, so that the second pre-processed data signal relayed from the last synchronous stage of the second clocked digital signal path circuit after passing the reverse path reaches the second stop input of the second start/stop time measuring device.

9. The signal processing device according to claim 1, which further comprises a digital-to-analog converter (DAC) configured to convert the first digital data yielded by the first clocked digital signal path circuit into the first analog signal, and a digitally controlled oscillator (DCO) configured to convert the second digital data yielded by the second clocked digital signal path circuit into the second analog signal, and which further comprises a combiner configured to combine the first analog signal and the second analog signal to acquire a combined output signal.

10. The signal processing device according to claim 9, in which the combiner comprises a mixer or a multiplexer.

11. The signal processing device according to claim 10, in which the first clocked digital signal path circuit comprises a first adjustable delay unit configured to adjust a first digital delay, and the second clocked digital signal path circuit comprises a second adjustable delay unit configured to adjust a second digital delay, wherein the first digital delay can be adjusted only in steps of a clock period of the first clock signal, and wherein the second digital delay can be adjusted only in steps of a clock period of the second clock signal; and wherein the clock generator is configured to adjust the relative temporal position of clock edges of the first clock signal and clock edges of the second clock signal with a resolution smaller than one clock period of the first clock signal or of the second clock signal.

12. A signal processing device to provide a first analog signal and a second analog signal, comprising the following features:

a first clocked digital signal path circuit configured to yield first digital data for providing the first analog signal;

a second clocked digital signal path circuit configured to yield second digital data for providing the second analog signal;

a transit time difference measuring device configured to yield a transit time difference measuring signal describing a difference between a signal transit time along a first measuring path and a signal transit time along a second measuring path, with the first measuring path comprising a first clock supply configured to supply a first clock signal configured to clock a last synchronous stage of the first clocked digital signal path circuit, and with the second measuring path comprising a second clock supply configured to supply a second clock signal configured to clock a last synchronous stage of the second clocked digital signal path circuit.

13. A signal processing device to provide a first analog signal and a second analog signal, comprising the following features:

a first clocked digital signal path circuit configured to yield first digital data for providing the first analog signal;

a second clocked digital signal path circuit configured to yield second digital data for providing the second analog signal; and a clock generator configured to provide a first clock signal to clock a last synchronous stage of the first clocked digital signal path circuit and a second clock signal to clock a last synchronous stage of the second clocked digital signal path circuit, with the clock generator being configured to adjust a relative temporal position of clock edges of the first clock signal and clock edges of the second clock signal in reference to each other in order to achieve a temporal synchronization of the first analog signal and the second analog signal.

14. The signal processing device according to claim 13, in which the clock generator comprises a clock generation flip-flop and a phase selector, wherein the phase selector is configured to generate a control signal stating at which clock edge of an input clock signal the clock generation flip-flop switches to generate an output clock signal, with the phase selector comprising a synchronous circuit to generate a control signal, wherein flip-flops of the synchronous circuit of the phase selector are configured such that the signal delay in the flip-flops of the synchronous circuit of the phase selector is at least 10 times the signal delay of the clock generation flip-flop.

15. A method for providing a first analog signal and a second analog signal comprising:

clocked switching of a first clocked digital signal path circuit to yield first digital data for providing the first analog signal;

clocked switching of a second clocked digital signal path circuit to yield second digital data for providing the second analog signal; and measuring a difference between a signal transit time along a first measuring path and a signal transit time along a second measuring path in order to yield a transit time difference measuring signal, wherein the first measuring path comprises a first clock supply configured to supply a first clock signal configured to clock one or more of a plurality of stages of the first clocked digital signal path circuit, and wherein the second measuring path comprises a second clock supply configured to supply a second clock signal configured to clock one or more of a plurality of stages of the second clocked digital signal path circuit.

* * * * *